(12) United States Patent
Li et al.

(10) Patent No.: US 11,323,854 B2
(45) Date of Patent: May 3, 2022

(54) MULTI-TERMINAL COOPERATIVE WORKING METHOD, TERMINAL DEVICE, AND MULTI-TERMINAL COOPERATIVE SYSTEM

(71) Applicant: HUAWEI TECHNOLOGIES CO., LTD., Shenzhen (CN)

(72) Inventors: Ruihua Li, Shenzhen (CN); Wei Xiao, Shenzhen (CN); Fan Fan, Shenzhen (CN); Hua Chen, Shanghai (CN); Lelin Wang, Shenzhen (CN); Jiang Li, Shenzhen (CN); Heng Liao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 190 days.

(21) Appl. No.: 16/884,022

(22) Filed: May 26, 2020

(65) Prior Publication Data

US 2020/0288283 A1 Sep. 10, 2020

Related U.S. Application Data

(63) Continuation of application No. PCT/CN2018/116029, filed on Nov. 16, 2018.

(30) Foreign Application Priority Data

Nov. 27, 2017 (CN) .......................... 201711209105.8

(51) Int. Cl.
*H04W 4/16* (2009.01)
*H04W 84/20* (2009.01)

(52) U.S. Cl.
CPC .............. *H04W 4/16* (2013.01); *H04W 84/20* (2013.01)

(58) Field of Classification Search
None
See application file for complete search history.

(56) References Cited

U.S. PATENT DOCUMENTS

| 2004/0148611 A1* | 7/2004 | Manion ................... H04L 29/06 |
| | | 719/328 |
| 2015/0039740 A1* | 2/2015 | Yamada .............. H04L 12/2807 |
| | | 709/223 |

(Continued)

FOREIGN PATENT DOCUMENTS

| CN | 101127987 A | 2/2008 |
| CN | 102487517 A | 6/2012 |

(Continued)

*Primary Examiner* — Robert M Morlan
(74) *Attorney, Agent, or Firm* — Rimon PC

(57) ABSTRACT

Various embodiment provide a multi-terminal cooperative working method, a terminal device, and a multi-terminal cooperative system. In those embodiments, a primary device can send networking information to a plurality of secondary devices, and the primary device has a permission to manage the cooperative network. The primary device can receive networking confirmation information sent by the plurality of secondary devices; and send configuration information to the plurality of secondary devices separately. The configuration information can be used to instruct to switch, based on a preset management permission switching mechanism when the primary device becomes abnormal or the primary device exits from the cooperative network, the permission to manage the cooperative network. The primary device can clear the secondary device from the cooperative network the secondary device becomes abnormal. In this way, robustness of the cooperative network can be improved.

17 Claims, 15 Drawing Sheets

(56) References Cited

U.S. PATENT DOCUMENTS

2016/0105320 A1    4/2016  Osterberg et al.
2020/0059352 A1*   2/2020  Walling .................. H04L 9/006

FOREIGN PATENT DOCUMENTS

| | | |
|---|---|---|
| CN | 102571452 A | 7/2012 |
| CN | 103475908 A | 12/2013 |
| CN | 106253471 A | 12/2016 |
| CN | 106648997 A | 5/2017 |
| CN | 106851630 A | 6/2017 |
| CN | 107005790 A | 8/2017 |
| CN | 107027066 A | 8/2017 |
| CN | 107071811 A | 8/2017 |
| EP | 0748085 A1 | 12/1996 |
| EP | 2879345 A1 | 6/2015 |
| EP | 3235280 A1 | 10/2017 |
| WO | 2016099839 A1 | 6/2016 |

* cited by examiner

MULTI-TERMINAL COOPERATIVE WORKING METHOD, TERMINAL DEVICE, AND MULTI-TERMINAL COOPERATIVE SYSTEM

CROSS-REFERENCE TO RELATED APPLICATION

This application is a continuation of International Application No. PCT/CN2018/116029, filed on Nov. 16, 2018, which claims priority to Chinese Patent Application No. 201711209105.8, filed on Nov. 27, 2017, The disclosures of the aforementioned applications are hereby incorporated by reference in their entireties.

TECHNICAL FIELD

This application relates to the communications field, and more specifically, to a multi-terminal cooperative working method, a terminal device, and a multi-terminal cooperative system.

BACKGROUND

A plurality of terminal devices may form a cooperative network by enabling a hotspot service of a terminal device or using a router. After the cooperative network is formed, the devices in the cooperative network can together perform a cooperative task such as cooperative playing, cooperative sound recording, or a cooperative conference.

The cooperative network generally includes a primary device and a plurality of secondary devices. The primary device has permission to manage the cooperative network, and is configured to control the secondary devices to perform a cooperative task together. The secondary devices perform the cooperative task based on control information of the primary device. Specifically, functions of the primary device may include: sending broadcast, performing cooperative networking, sending a synchronous time check message, completing synchronization, sending a sound pickup or playing instruction, and the like. Functions of the secondary device may include: receiving the broadcast, joining a cooperative network, replying to the synchronous time check message, completing synchronization, executing the sound pickup or playing instruction, and the like.

The cooperative network can implement a function that cannot be implemented by a single terminal (for example, cooperative playing performed by a plurality of terminals can greatly improve a playing effect), and can bring good user experience. When the cooperative network is operating, to enable the plurality of terminal devices in the cooperative network to well perform a cooperative task, proper robustness of the cooperative network needs to be ensured. Therefore, how to ensure proper robustness of the cooperative network is a problem that needs to be resolved.

SUMMARY

Various embodiments provide a multi-terminal cooperative working method, a terminal device, and a multi-terminal cooperative system, to improve robustness of a cooperative network.

According to a first aspect, a multi-terminal cooperative working method is provided. The method includes: sending, by a primary device, networking information to a plurality of secondary devices, where the networking information is used to establish a cooperative network between the primary device and the plurality of secondary devices, and the primary device has permission to manage the cooperative network; receiving, by the primary device, networking confirmation information sent by the plurality of secondary devices, where the networking confirmation information is used to indicate that the secondary devices have accessed the cooperative network; sending, by the primary device, configuration information to the plurality of secondary devices separately, where the configuration information is used to instruct to switch, based on a preset management permission switching mechanism when the primary device becomes abnormal or the primary device exits from the cooperative network, the permission to manage the cooperative network; and clearing, by the primary device when one of the plurality of secondary devices becomes abnormal, the secondary device from the cooperative network based on a preset clearing rule.

Herein, by sending the configuration information to the secondary devices, the primary device can complete switching of the management permission based on the preset mechanism when the primary device becomes abnormal; and can clear a secondary device from the cooperative network when the secondary device becomes abnormal. In other words, regardless of whether the primary device or a secondary device becomes abnormal, there is a corresponding processing mechanism in this application. Therefore, this application can improve robustness of the cooperative network.

With reference to the first aspect, in some implementations of the first aspect, the method further includes: obtaining, by the primary device, device capability information of the plurality of secondary devices; selecting, by the primary device based on the device capability information, at least one candidate device whose device capability meets a preset requirement from the plurality of secondary devices; and sequencing, by the primary device, the at least one candidate device to obtain a candidate device list, where a target candidate device in the candidate device list is configured to take over the management permission of the primary device when the primary device becomes abnormal or the primary device exits from the cooperative network, and the target candidate device is a candidate device selected from the at least one candidate device in the candidate device list based on a sequencing order of the candidate device list.

Compared with a way of directly determining a device as a standby device, candidate devices can be selected more properly through comprehensive consideration of capability information of each secondary device, and then a more suitable candidate device can be used to replace the primary device when the primary device becomes abnormal or needs to exit from the network.

With reference to the first aspect, in some implementations of the first aspect, the sequencing, by the primary device, the at least one candidate device to obtain a candidate device list includes: determining, by the primary device, a device capability of the at least one candidate device based on device capability information of the at least one candidate device; and sequencing, by the primary device, the at least one candidate device in ascending or descending order of device capabilities, to obtain the candidate device list.

The candidate devices are sequenced based on device capabilities, and a target candidate device to replace the primary device can be quickly found, thereby simplifying complexity of device switchover.

With reference to the first aspect, in some implementations of the first aspect, the device capability information includes at least one of a central processing unit CPU operating speed of a device, a memory capacity of the device, remaining power of the device, a power consumption speed of the device, and a communication capability of the device.

With reference to the first aspect, in some implementations of the first aspect, the configuration information is specifically used to instruct a standby device preset in the plurality of secondary devices to take over, when the primary device becomes abnormal or needs to exit from the cooperative network, the management permission of the primary device.

When the primary device becomes abnormal or needs to exit from the cooperative network, the preset standby device takes over the management permission of the primary device, to ensure that the devices in the cooperative network can still work normally, thereby improving robustness of the cooperative network.

With reference to the first aspect, in some implementations of the first aspect, the clearing, by the primary device when one of the plurality of secondary devices becomes abnormal, the secondary device from the cooperative network based on a preset clearing rule includes: clearing the secondary device from the cooperative network when at least one of the following conditions occurs on the secondary device: a transmission delay between the secondary device and the primary device exceeds a preset delay; a distance between the secondary device and the primary device exceeds a preset distance; a version of an operating system is earlier than a preset version; available power is lower than preset power; and an available resource does not meet a preset requirement.

When one of the foregoing conditions occurs on a secondary device, it may be considered that a device capability of the secondary device cannot satisfy a requirement for normal cooperative working. In this case, the secondary device whose device capability cannot satisfy the requirement is cleared from the cooperative network, to avoid an impact that would otherwise be caused by the secondary device whose device capability cannot satisfy the requirement on cooperative working of the entire cooperative network.

With reference to the first aspect, in some implementations of the first aspect, the method further includes: sending, by the primary device, call transfer information to the plurality of secondary devices, where the call transfer information is used to set call transfer for the plurality of secondary devices.

By setting call transfer, a secondary device can continue to perform a cooperative task in the cooperative network, so that when an incoming call arrives, the cooperative network can continue to perform cooperative work without being disturbed by the incoming call, and the cooperative network has desired robustness.

Optionally, the call transfer information may be used to set call transfer numbers for the plurality of secondary devices respectively. When there is an incoming call for a secondary device, the incoming call may be transferred to a preset number, so that the secondary device can work normally in the cooperative network.

The call transfer information may be used to set a same call transfer number for the plurality of secondary devices. When there is an incoming call for any one of the plurality of secondary devices, the incoming call is transferred to the preset call transfer number.

However, when there are incoming calls for two or more secondary devices simultaneously, it is not enough to set only one call transfer number. Therefore, the call transfer information may be used to set two or more call transfer numbers for the plurality of devices. Further, the call transfer information may be used to set a call transfer number for each of the plurality of devices. In this way, it can be ensured that each secondary device can smoothly perform call transfer when an incoming call arrives.

With reference to the first aspect, in some implementations of the first aspect, the method further includes: when there is an incoming call for the primary device, transferring the incoming call to a preset number.

The primary device plays a more important role in the cooperative network. Therefore, when there is an incoming call for the primary device, the incoming call is transferred to the preset number, and the primary device is not disturbed by the incoming call but continues to perform cooperative work, so that the cooperative network has desired robustness.

According to a second aspect, a multi-terminal cooperative working method is provided. The method includes: receiving, by a first secondary device, networking information sent by a primary device, where the networking information is used to establish a cooperative network between the primary device and a plurality of secondary devices, the first secondary device is any one of the plurality of secondary devices, and the primary device has permission to manage the cooperative network; sending, by the first secondary device, networking confirmation information to the primary device, where the networking confirmation information is used to indicate that the first secondary device has accessed the cooperative network; and receiving, by the first secondary device, configuration information sent by the primary device, where the configuration information is used to instruct to switch, based on a preset management permission switching mechanism when the primary device becomes abnormal or the primary device exits from the cooperative network, the permission to manage the cooperative network.

With reference to the second aspect, in some implementations of the second aspect, the method further includes: receiving, by the first secondary device, a candidate device list sent by the primary device, where the candidate device list is obtained by: selecting, by the primary device based on device capability information, at least one candidate device whose device capability meets a preset requirement from the plurality of secondary devices; and sequencing the at least one candidate device.

According to a third aspect, a multi-terminal cooperative working method is provided. The method includes: sending, by a primary device, networking information to a plurality of secondary devices, where the networking information is used to establish a cooperative network between the primary device and the plurality of secondary devices, and the primary device has permission to manage the cooperative network; receiving, by the primary device, networking confirmation information sent by the plurality of secondary devices, where the networking confirmation information is used to indicate that the secondary devices have accessed the cooperative network; and determining, by the primary device based on a quantity of devices included in the cooperative network and/or physical distances between devices in the cooperative network, a sound channel to be configured for each of the plurality of secondary devices.

In this application, based on the quantity of devices included in the cooperative network and/or the physical distances between the devices in the cooperative network, a sound channel can be properly allocated to each device in the cooperative network, thereby improving a sound effect when cooperative playing or cooperative sound recording is performed in the cooperative network.

With reference to the third aspect, in some implementations of the third aspect, the configuring, by the primary device, a sound channel for a device in the cooperative network based on a quantity of devices included in the cooperative network and/or physical distances between devices in the cooperative network includes: allocating, by the primary device based on the quantity of devices included in the cooperative network, the devices in the cooperative network evenly to a plurality of preset sound channels, so that quantities of devices in symmetrical sound channels are the same.

When the quantities of devices in the symmetrical sound channels are the same, sound volumes of the symmetrical sound channels can be balanced to improve subjective quality of sound.

With reference to the third aspect, in some implementations of the third aspect, the configuring, by the primary device, a sound channel for a device in the cooperative network based on a quantity of devices included in the cooperative network and/or physical distances between devices in the cooperative network includes: allocating, by the primary device to a same sound channel, devices whose physical distances are less than a preset distance in the cooperative network.

With reference to the third aspect, in some implementations of the third aspect, the method further includes: when the quantity of devices in the cooperative network has changed, reallocating, by the primary device, a sound channel to at least one device in the cooperative network, so that quantities of devices in symmetrical sound channels in the cooperative network are the same.

When the quantity of devices in the cooperative network has changed, the sound channel configured for each secondary device in the cooperative network is adjusted, so that the quantities of devices in symmetrical sound channels are the same. In this way, after the quantity of devices has changed, there is still a desired sound effect when each device in the cooperative network performs cooperative playing or cooperative sound recording.

With reference to the third aspect, in some implementations of the third aspect, the cooperative network is a network of a K-tree structure, and the method further includes: allocating, by the primary device, devices in each of K trees to a same sound channel separately, where K is an integer greater than 1.

With reference to the third aspect, in some implementations of the third aspect, the method further includes: sending, by the primary device, sound channel configuration indication information to the plurality of secondary devices, where the sound channel configuration indication information received by any one of the plurality of secondary devices is used to indicate, on a display interface of any one of the secondary devices, a location at which any one of the secondary devices needs to be placed and/or a direction in which any one of the secondary devices needs to be placed during sound channel configuration.

By indicating, on the display interface, a location at which a secondary device needs to be placed and/or a direction in which the secondary device needs to be placed during sound channel configuration, a user can be instructed simply and conveniently to operate the secondary device to complete sound channel adjustment.

According to a fourth aspect, a terminal device is provided. The terminal device includes modules configured to perform the method according to any one of the first aspect or the implementations of the first aspect.

According to a fifth aspect, a terminal device is provided. The terminal device includes modules configured to perform the method according to any one of the second aspect or the implementations of the second aspect.

According to a sixth aspect, a terminal device is provided. The terminal device includes modules configured to perform the method according to any one of the third aspect or the implementations of the third aspect.

According to a seventh aspect, a multi-terminal cooperative system is provided. The multi-terminal cooperative system includes a primary device and a plurality of secondary devices. The primary device sends networking information to the plurality of secondary devices, where the networking information is used to establish a cooperative network between the primary device and the plurality of secondary devices, and the primary device has permission to manage the cooperative network. The plurality of secondary devices separately send networking confirmation information to the primary device, where the networking confirmation information is used to indicate that the secondary devices have accessed the cooperative network. The primary device sends configuration information to the plurality of secondary devices separately, where the configuration information is used to instruct to switch, based on a preset management permission switching mechanism when the primary device becomes abnormal or the primary device exits from the cooperative network, the permission to manage the cooperative network. When the primary device becomes abnormal or the primary device exits from the cooperative network, the plurality of secondary devices switch, based on the preset management permission switching mechanism, the permission to manage the cooperative network. When one of the plurality of secondary devices becomes abnormal, the primary device clears the secondary device from the cooperative network based on a preset clearing rule.

According to an eighth aspect, a terminal device is provided. The terminal device includes: a memory, configured to store a program; and a processor, configured to execute the program stored in the memory. When the program is executed, the processor is configured to perform the method according to any one of the first aspect or the implementations of the first aspect.

According to a ninth aspect, a terminal device is provided. The terminal device includes: a memory, configured to store a program; and a processor, configured to execute the program stored in the memory. When the program is executed, the processor is configured to perform the method according to any one of the second aspect or the implementations of the second aspect.

According to a tenth aspect, a terminal device is provided. The terminal device includes: a memory, configured to store a program; and a processor, configured to execute the program stored in the memory. When the program is executed, the processor is configured to perform the method according to any one of the third aspect or the implementations of the third aspect.

According to an eleventh aspect, a computer readable medium is provided. The computer readable medium stores program code to be executed by a device, where the program code includes an instruction used to perform the method according to any one of the first aspect or the implementations of the first aspect.

According to a twelfth aspect, a computer readable medium is provided. The computer readable medium stores program code to be executed by a device, where the program code includes an instruction used to perform the method according to any one of the second aspect or the implementations of the second aspect.

According to a thirteenth aspect, a computer readable medium is provided. The computer readable medium stores program code to be executed by a device, where the program code includes an instruction used to perform the method according to any one of the third aspect or the implementations of the third aspect.

DESCRIPTION OF EMBODIMENTS

The following describes technical solutions in this application with reference to the accompanying drawings.

Figure 1:
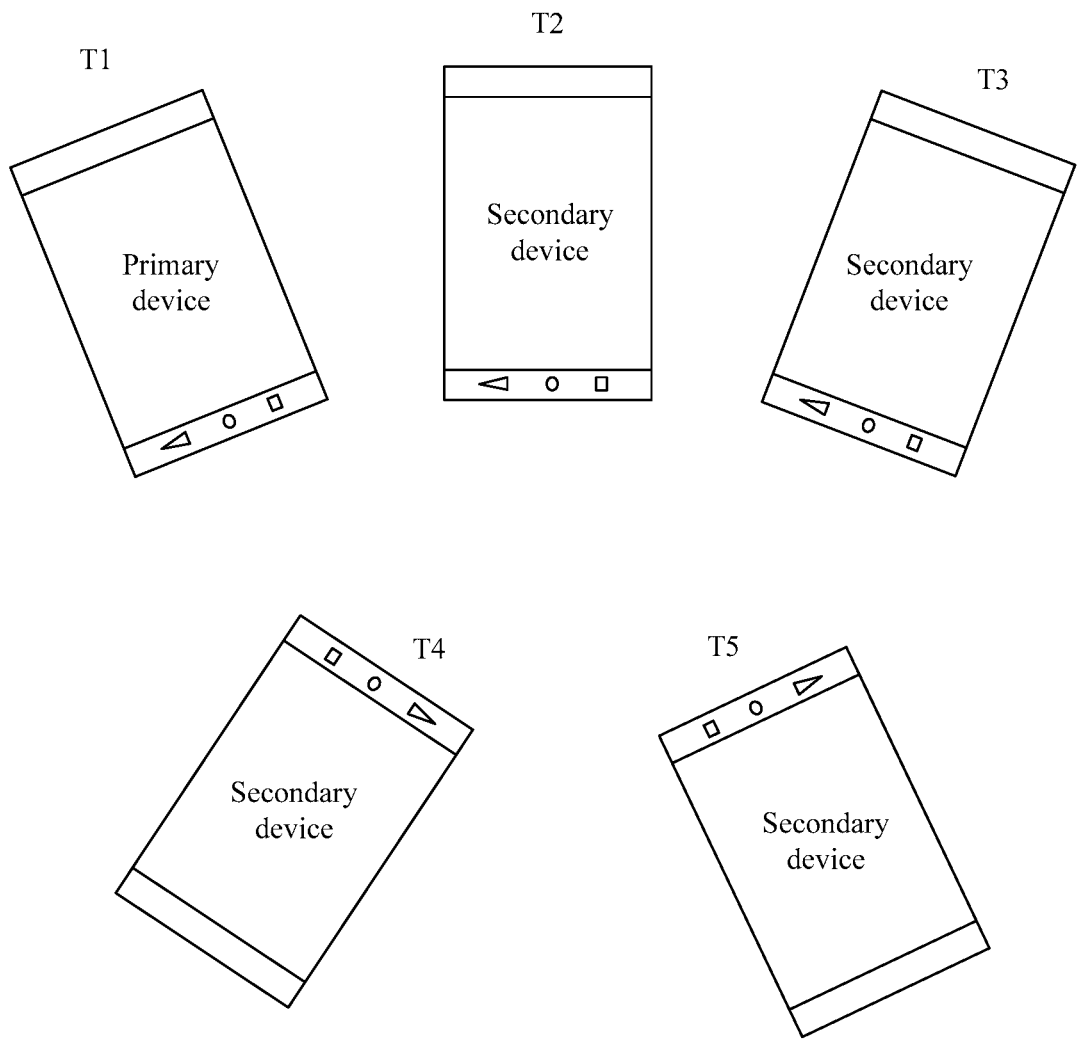
FIG. 1 is a schematic diagram of a cooperative network according one embodiment.

To better understand a multi-terminal cooperative working method in the embodiments of this application, the following briefly describes a possible application scenario of an embodiment of this application with reference to FIG. 1.

FIG. 1 is a schematic diagram of a cooperative network according one embodiment.

As shown in FIG. 1, terminal devices $T_1$, $T_2$, $T_3$, $T_4$, and $T_5$ form a cooperative network together. $T_1$ is a primary device (also referred to as a primary), $T_2$, $T_3$, $T_4$, and $T_5$ are secondary devices (also referred to as secondarys). The terminal devices may form the cooperative network by enabling a hotspot service of a terminal device or using a router. In some embodiments, $T_1$ may perform networking by sending a broadcast message to each secondary device. After the networking succeeds, $T_1$ sends a synchronous time check message (for example, a handshake message) to each secondary device to perform network synchronization. After the networking succeeds and the synchronization is completed, each device in the cooperative network may perform cooperative playing, cooperative sound recording, a cooperative conference, or the like, under the control of $T_1$.

It should be understood that the cooperative network shown in FIG. 1 is merely an example implementation; a networking manner and a network structure of a cooperative network, a quantity of and types of terminal devices included in a cooperative network, and the like, are not limited in this embodiment of this application; and any cooperative network that can implement a cooperative task by combining a plurality of terminal devices together falls within the protection scope of this embodiment in accordance with the present disclosure. It may be understood that "a plurality of" described in this embodiment of this application may be at least two, for example, may be 2, 3, 6, 8, or 11.

The terminal device in this embodiment may be a mobile phone, a personal digital assistant (PDA), a tablet, a wearable device, another intelligent device that can implement communication between devices, or the like.

Figure 2:
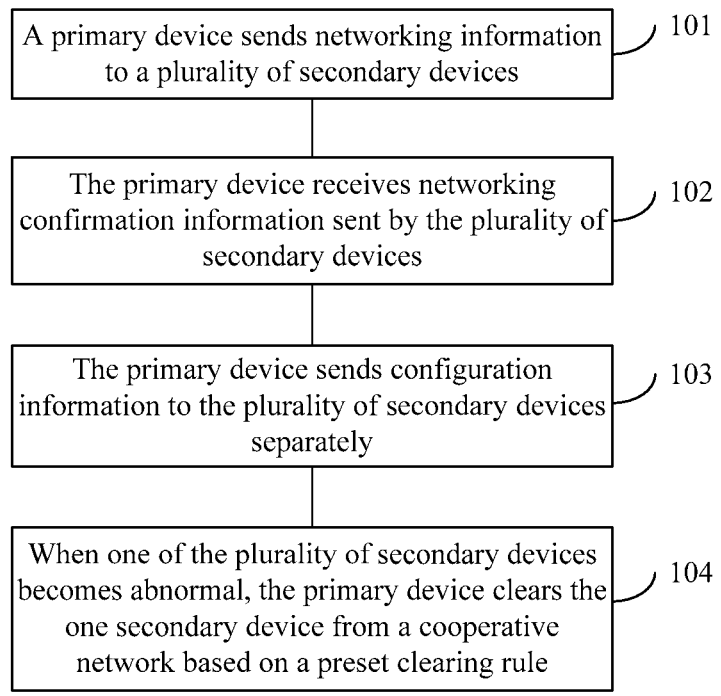
FIG. 2 is a schematic flowchart of a multi-terminal cooperative working method according one embodiment.

FIG. 2 is a schematic flowchart of a multi-terminal cooperative working method according one embodiment. The method shown in FIG. 2 may be performed by a terminal device. The method shown in FIG. 2 includes step 101 to step 104. Step 101 and step 102 mainly describe a networking process, and step 103 and step 104 mainly describe some mechanisms for ensuring desired robustness of a cooperative network. Step 101 to step 104 are separately described in detail below.

101. A primary device sends networking information to a plurality of secondary devices.

For example, as shown in FIG. 1, $T_1$ is a primary device, and $T_2$, $T_3$, $T_4$, and $T_5$ are secondary devices. During networking, $T_1$ sends networking information to $T_2$, $T_3$, $T_4$, and $T_5$. In an implementation manner, the networking information may be first sent by $T_1$ to one secondary device, and then the secondary device forwards the networking information to another secondary device.

The networking information is used to establish a cooperative network between the primary device and the plurality of secondary devices, and the primary device has permission to manage the cooperative network. It should be understood that "the primary device has permission to manage the cooperative network" may mean that networking of the cooperative network is completed under the leadership of the primary device. In addition, "the primary device has permission to manage the cooperative network" may mean that the primary device controls various devices (including the primary device) in the cooperative network to perform a cooperative task. For example, the primary device controls the devices in the cooperative network to perform cooperative sound recording, cooperative playing, or the like.

In some embodiments, the primary device may send the networking information to each secondary device in a broadcast manner. In other words, the networking information may be a broadcast message sent by the primary device to each secondary device.

The foregoing primary device may be selected from a plurality of terminal devices. The primary device is configured to control each device in the cooperative network to perform a cooperative task.

The primary device may be selected from the plurality of terminal devices based on capabilities of the terminal devices, and a terminal device whose capability is the strongest is selected from the plurality of terminal devices and is used as the primary device. For example, based on aspects such as a memory capacity, a central processing unit (CPU) processing speed, and remaining power, a terminal device whose capability is the strongest may be selected from the plurality of terminal devices and used as the primary device.

102. The primary device receives networking confirmation information sent by the plurality of secondary devices.

The networking confirmation information may be a reply or a response, from the secondary device, to the networking information sent by the primary device. After a secondary device receives the networking information sent by the primary device, if the secondary device determines to join the cooperative network, the secondary device may send the networking confirmation information to the primary device, to confirm that the secondary device will join the cooperative network.

There are a plurality of implementations through which the plurality of secondary devices send the networking confirmation information to the primary device. In one implementation, each of the plurality of secondary devices directly sends a piece of networking confirmation information to the primary device. In another implementation, a secondary device may send networking confirmation information received from another secondary device to the primary device in a forwarding manner.

It should be understood that a manner of establishing a cooperative network by using networking information is not limited in this application. Various existing networking manners may be used to establish a cooperative network.

In some embodiments, the primary device sends a synchronous time check message to the plurality of secondary devices.

It should be understood that after the networking succeeds, the primary device and a secondary device may further perform time check with each other for the first time by using a synchronous time check message. The synchronous time check message herein may specifically be a handshake message.

103. The primary device sends configuration information to the plurality of secondary devices.

The configuration information is used to instruct to switch, based on a preset management permission switching mechanism when the primary device becomes abnormal or the primary device needs to exit from the cooperative network, the permission to manage the cooperative network.

The preset management permission switching mechanism may mean that, when the primary device becomes abnormal or the primary device needs to exit from the cooperative network, the permission to manage the cooperative network is switched from the primary device to one of the plurality of secondary devices. In other words, when the primary device becomes abnormal or the primary device needs to exit from the cooperative network, one of the plurality of secondary devices performs switchover to become a primary device.

104. When one of the plurality of secondary devices becomes abnormal, the primary device clears the secondary device from a cooperative network based on a preset clearing rule.

The secondary device may be any one of the plurality of secondary devices.

The preset clearing rule may mean that when a secondary device becomes abnormal, the primary device clears the secondary device from the cooperative network by using a preset communications procedure. For example, when a secondary device becomes abnormal, the primary device sends clearing information to the secondary device. After receiving the clearing information, the secondary device displays, on a display interface, whether to exit from the cooperative network. When a user chooses to exit from the cooperative network, the secondary device returns exit confirmation information to the primary device and then exits from the cooperative network.

In addition, that the primary device or the secondary device becomes abnormal may specifically mean that: a resource of the device is insufficient (for example, memory is insufficient, power is insufficient, or a data processing capability of a CPU is insufficient), or the device has a fault (for example, device overheating or system crash) and cannot continue to perform a cooperative task.

That the primary device exits from the cooperative network may specifically mean that there is an incoming call for the primary device, or the primary device needs to perform another task, or the like. Specifically, a time point at which the primary device exits from the cooperative network may be when there is an incoming call but the primary device has not answered the incoming call, or the primary device is about to perform another task but does not yet perform the another task.

In accordance with the present disclosure, by sending the configuration information to the secondary devices, the primary device can complete switching of the management permission based on the preset mechanism when the primary device becomes abnormal; and can clear a secondary device from the cooperative network when the secondary device becomes abnormal. In other words, regardless of whether the primary device or a secondary device becomes abnormal, there is a corresponding processing mechanism in this application. Therefore, this application can improve robustness of the cooperative network.

To help to understand processes of networking and time check, description is given below with reference to FIG. 3.

Figure 3:
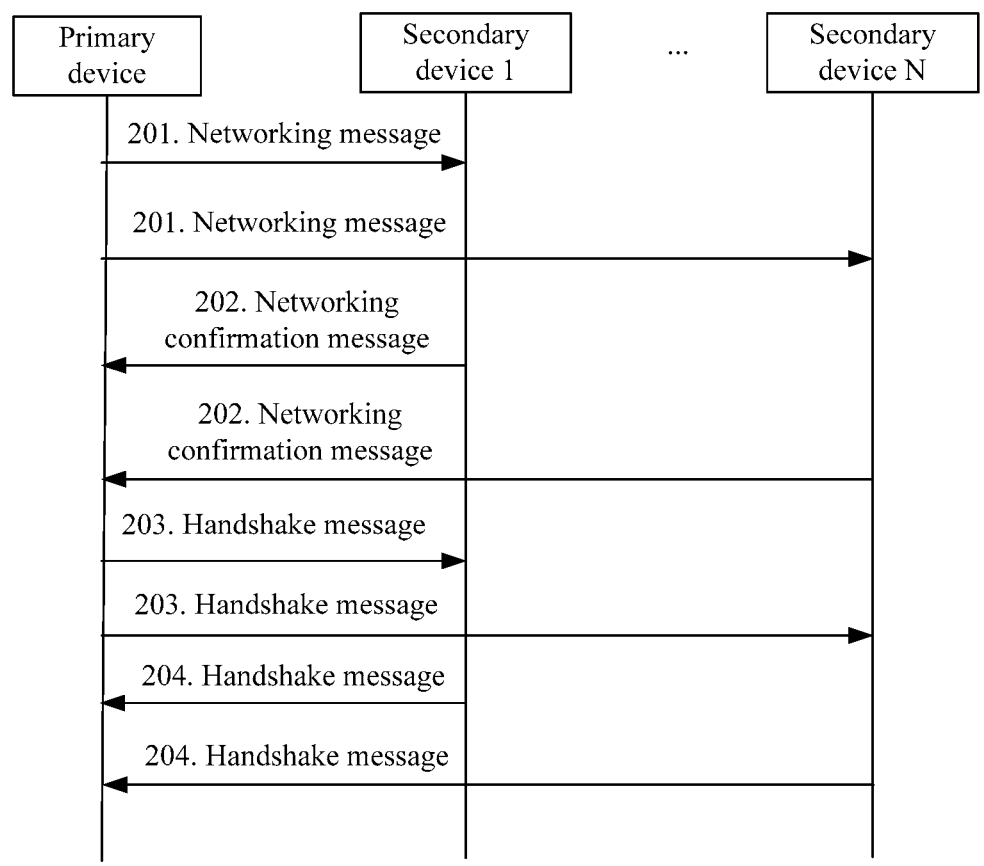
FIG. 3 is a schematic flowchart of a multi-terminal cooperative working method according one embodiment.

As shown in FIG. 3, specific processes of networking and time check between a primary device and N secondary devices include the following steps.

201. The primary device sends networking information to the N secondary devices.

The networking information is used to establish a cooperative network between the primary device and the N secondary devices.

202. Each of the N secondary devices sends networking confirmation information to the primary device.

The networking confirmation information herein may be used to indicate that a corresponding secondary device determines to join the cooperative network.

203. The primary device sends a handshake message to the N secondary devices.

204. Each of the N secondary devices returns a handshake message to the primary device.

It should be understood that, in step 203 and step 204, time check may be performed between the primary device and the N secondary devices by sending a handshake message for a plurality of times, to implement preliminary synchronization between the devices.

In some embodiments, the configuration information may be used to instruct a standby device preset in the plurality of secondary devices to take over, when the primary device becomes abnormal or needs to exit from the cooperative network, the management permission of the primary device. The standby device may be preset during networking or before networking of the cooperative network.

In accordance with the disclosure, when the primary device becomes abnormal or needs to exit from the cooperative network, the preset standby device takes over the management permission of the primary device, to ensure that the devices in the cooperative network can still work normally, thereby improving robustness of the cooperative network.

During setting of the standby device, a terminal device that is closest to the primary device in the plurality of secondary devices may be determined as the standby device, or a device whose capability is the strongest in the plurality of secondary devices may be determined as the standby device.

In one embodiment, the primary device periodically sends a heartbeat message to the plurality of secondary devices.

When the standby device is still unable to receive the heartbeat message within a preset time, the standby device may perform switchover to become a new primary device, to control other secondary devices to continue to perform a cooperative task.

Figure 4:
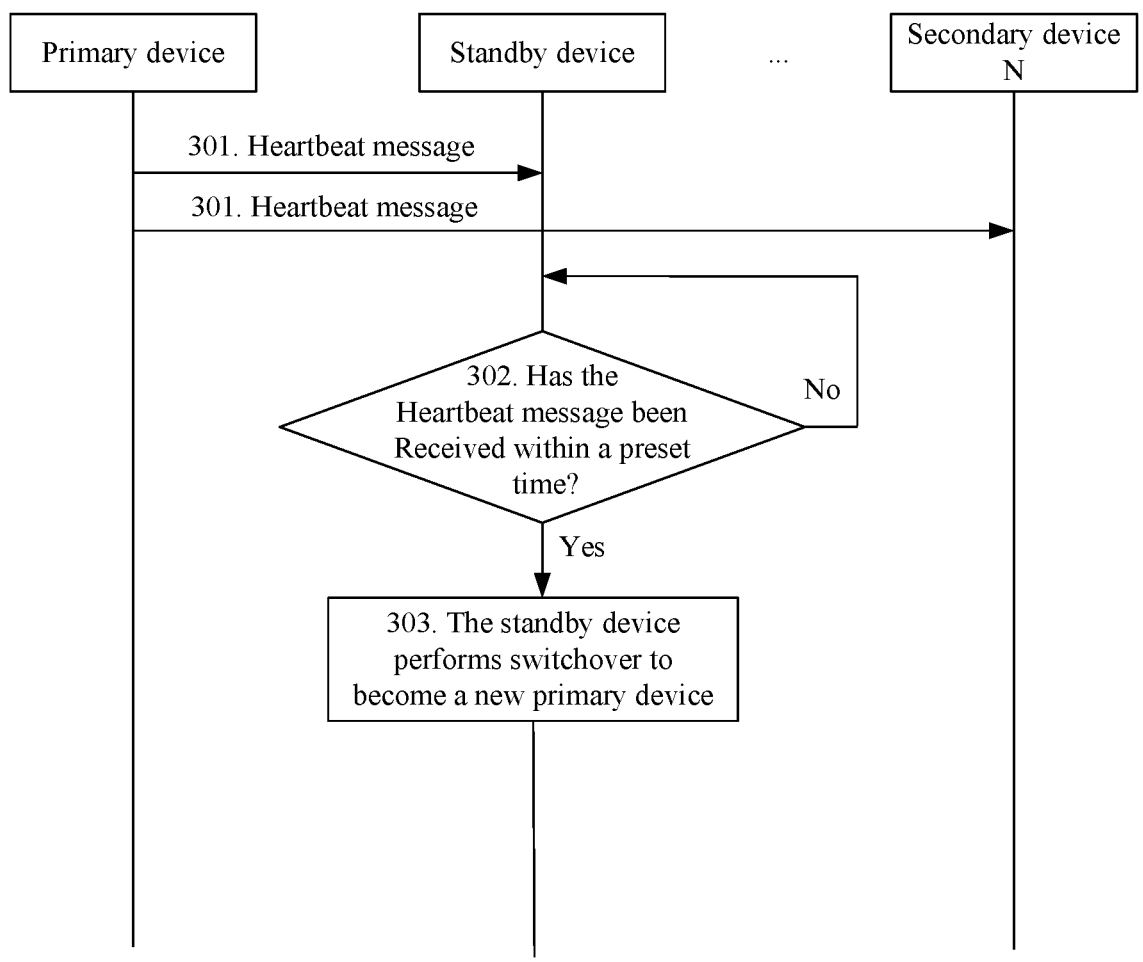
FIG. 4 is a schematic flowchart of a multi-terminal cooperative working method according one embodiment.

The following describes, with reference to FIG. 4, a process concerning how the standby device performs switchover to become a new primary device when the primary device becomes abnormal.

As shown in FIG. 4, when the primary device becomes abnormal, a process of switchover of the standby device specifically includes the following steps.

301. The primary device sends a heartbeat message to N secondary devices.

302. The standby device determines whether the heartbeat message sent by the primary device has been received within a preset time.

If the standby device has received the heartbeat message sent by the primary device within the preset time, it may be considered that the primary device is normal and the standby device continues to perform step 302. If the standby device does not receive the heartbeat message sent by the primary device within the preset time, it may be considered that the primary device becomes abnormal, and step 303 is performed next.

303. The standby device performs switchover to become a new primary device.

In one embodiment, the multi-terminal cooperative working method further includes:

obtaining, by the primary device, device capability information of the plurality of secondary devices;

selecting, by the primary device based on the device capability information, at least one candidate device whose device capability meets a preset requirement from the plurality of secondary devices; and sequencing, by the primary device, the at least one candidate device to obtain a candidate device list, where a target candidate device in the candidate device list is configured to take over the management permission of the primary device when the primary device becomes abnormal or the primary device exits from the cooperative network, and the target candidate device is a candidate device selected from the at least one candidate device in the candidate device list based on a sequencing order of the candidate device list.

In accordance with the present disclosure, compared with a way of directly determining a device as a standby device, candidate devices can be selected more properly through comprehensive consideration of capability information of each secondary device, and then a more suitable candidate device can be used to replace the primary device when the primary device becomes abnormal or needs to exit from the network.

Figure 5:
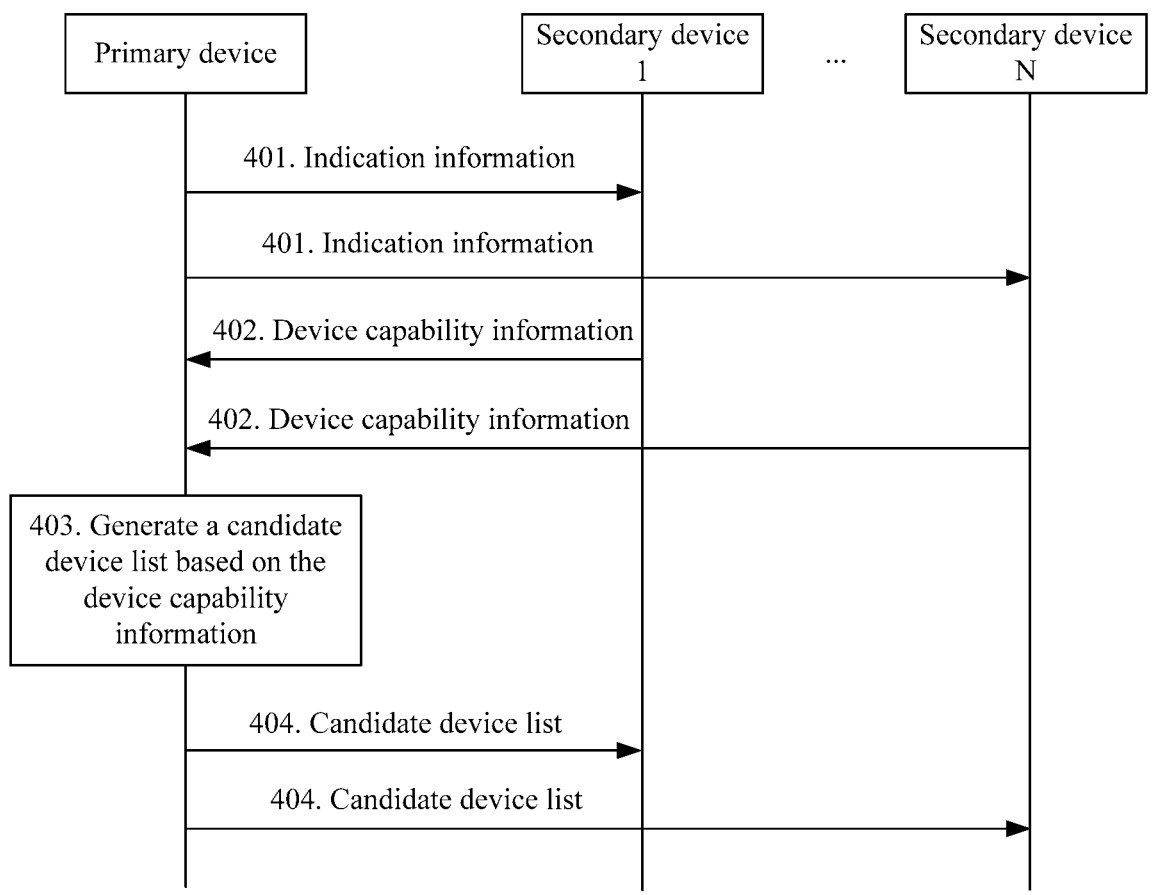
FIG. 5 is a schematic flowchart of a multi-terminal cooperative working method according one embodiment.

As shown in FIG. 5, a process in which the primary device determines the candidate device list and sends the candidate device list specifically includes the following steps.

401. The primary device sends indication information to N secondary devices.

The indication information is used to instruct the secondary devices to report their own device capability information to the primary device.

402. Each secondary device reports its own device capability information to the primary device.

403. The primary device generates a candidate device list based on the device capability information.

404. The primary device sends the generated candidate device list to each secondary device.

It should be understood that, when the primary device obtains the device capability information of each secondary device, step 401 may not be performed but step 402 is directly performed from the beginning. In other words, each secondary device directly reports its own device capability information to the primary device.

In addition, the primary device may periodically send indication information to each secondary device, and each secondary device periodically reports its own device capability information to the primary device. In this way, the primary device may periodically generate a candidate device list, and periodically send the candidate device list to each secondary device. Therefore, the candidate device list is updated in real time, so that a relatively accurate candidate device list may be determined in real time based on capability information of each device in the cooperative network.

In some embodiments, a specific process in which the primary device determines the candidate device list includes: obtaining, by the primary device, device capability information of the plurality of secondary devices; selecting, by the primary device based on the device capability information, at least one candidate device whose device capability meets a preset requirement from the plurality of secondary devices; and sequencing, by the primary device, the at least one candidate device to obtain a candidate device list.

In some embodiments, the sequencing, by the primary device, the at least one candidate device to obtain a candidate device list specifically includes: determining, by the primary device, a device capability of the at least one candidate device based on device capability information of the at least one candidate device; and sequencing, by the primary device, the at least one candidate device in ascending or descending order of device capabilities, to obtain the candidate device list.

When the at least one candidate device is sequenced by the primary device based on a descending order of the device capability to obtain the candidate device list, a secondary device whose rank in the candidate list meets a preset requirement may specifically be a secondary device ranked first in the candidate device list.

When the at least one candidate device is sequenced by the primary device based on an ascending order of the device capability to obtain the candidate device list, a secondary device whose rank in the candidate list meets a preset requirement may specifically be a secondary device ranked last in the candidate device list.

In some embodiments, the device capability information includes at least one of a CPU operating speed of a device, a memory capacity of the device, remaining power of the device, a power consumption speed of the device, and a communication capability of the device.

In some embodiments, when the primary device determines the device capability of the at least one candidate device based on the capability information of the at least one candidate device, the following Formula (1) may be used for calculation.

$$\text{Capability}(i) = CPU\_speed(i) \times w\_CPU + \text{Memory}(i) \times w\_M \quad (1)$$

In Formula (1), i represents an index number of a secondary device, Capability(i) represents a device capability of an $i^{th}$ secondary device, CPU_speed(i) represents a CPU operating speed of the $i^{th}$ secondary device, w_CPU Memory(i) represents a first weight, represents a storage capacity of the $i^{th}$ secondary device, and w_M represents a second weight. The first weight and the second weight may be preset.

In Formula (1), a device capability of a secondary device is calculated based on a CPU operating speed of the secondary device and a storage capacity of the secondary device. In some embodiments, in addition to calculating a device capability of a secondary device based on a CPU operating speed of the secondary device and a storage capacity of the secondary device, remaining power of the secondary device may also be taken into consideration to calculate the device capability of the secondary device, specifically as shown in Formula (2).

$$\text{Capability}(i) = (CPU\_speed(i) \times w\_CPU + \text{Memory}(i) \times w\_M) \times \text{Rest}(i) \quad (2)$$

In Formula (2), meanings of Capability(i), CPU_speed(i), w_CPU, and Memory(i) are the same as those in Formula (1), and Rest(i) represents a percentage of remaining power of an $i^{th}$ secondary device.

A capability of each of the at least one candidate device can be calculated according to Formula (1) or (2). Then, various candidate devices may be sequenced based on values of capabilities of the candidate devices. Specifically, the candidate devices may be sequenced based on a descending order of the device capabilities, or may be sequenced based on an ascending order of the device capabilities.

It should be understood that Formula (1) and Formula (2) are only two example implementations of determining a device capability of a secondary device based on device capability information of the secondary device. Actually, when a device capability of a secondary device is determined based on device capability information of the secondary device, the device capability of the secondary device may be calculated based on at least one of a CPU operating speed, a memory capacity of the device, remaining power of the device, a power consumption speed of the device, and a communication capability of the device. This is not limited in this application.

The foregoing describes a processing mechanism when the primary device becomes abnormal or needs to exit from the cooperative network. The following describes in detail a processing mechanism when the secondary device becomes abnormal.

In some embodiments, in an embodiment, when any one of the plurality of secondary devices becomes abnormal, the primary device clears the any one secondary device from the cooperative network based on a preset clearing rule, and this includes:

clearing the any one secondary device from the cooperative network when at least one of the following conditions occurs on the any one secondary device:

(1) A transmission delay between the any one secondary device and the primary device exceeds a preset delay.

For example, a transmission delay between the secondary device and the primary device exceeds 10 ms.

(2) A distance between the any one secondary device and the primary device exceeds a preset distance.

For example, a physical distance between the secondary device and the primary device exceeds 10 m.

(3) A version of an operating system is earlier than a preset version.

For example, a version of an Android operating system or another operating system of the secondary device is too early.

(4) Available power is lower than preset power.

For example, power of the secondary device is lower than 30%.

(5) An available resource does not meet a preset requirement.

When one of the foregoing conditions occurs on a secondary device, it may be considered that a device capability of the secondary device cannot satisfy a requirement for normal cooperative working. In this case, the secondary device whose device capability cannot satisfy the requirement is cleared from the cooperative network, to avoid an impact that would otherwise be caused by the secondary device whose device capability cannot satisfy the requirement on cooperative working of the entire cooperative network.

Figure 6:
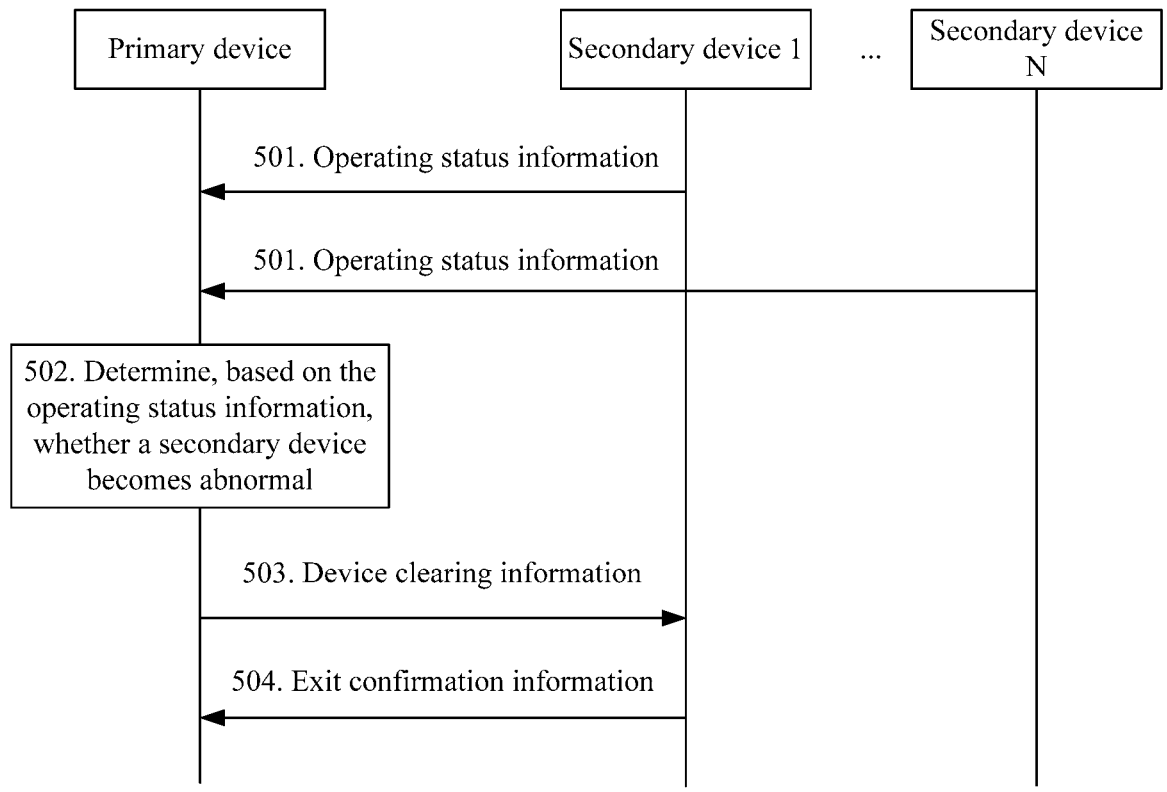
FIG. 6 is a schematic flowchart of a multi-terminal cooperative working method according one embodiment.

The following describes a process of clearing a secondary device when the secondary device becomes abnormal in detail with reference to FIG. 6.

As shown in FIG. 6, a example process in which the primary device clears a secondary device includes the following steps.

501. Each secondary device reports operating status information to the primary device.

502. The primary device determines, based on the operating status information, whether each secondary device becomes abnormal.

503. When a secondary device 1 becomes abnormal, the primary device sends device clearing information to the secondary device 1.

The device clearing information is used to clear a secondary device from the cooperative network, or to notify a corresponding secondary device to exit from the cooperative network. The primary device sends the device clearing information only to a secondary device that becomes abnormal.

504. The secondary device 1 returns exit confirmation information to the primary device.

After receiving the device clearing information, the secondary device 1 determines to exit from the cooperative network and sends the exit confirmation information to the primary device, indicating that the secondary device 1 determines to exit from the cooperative network.

It should be understood that in the foregoing step 501, each secondary device may periodically report its own operating status information.

In some embodiments, before step 501, the primary device sends indication information to each secondary device, where the indication information is used to instruct each secondary device to report operating status information to the primary device.

It should be understood that the process of clearing a secondary device is described in FIG. 5 by using, as an example, a case in which only one secondary device becomes abnormal. Actually, the primary device may handle a case in which a plurality of secondary devices are abnormal. In that case, the primary device may send clearing information to the plurality of abnormal secondary devices and then clear the plurality of abnormal secondary devices from the cooperative network.

In one embodiment, the method shown in FIG. 2 further includes: sending, by the primary device, call transfer information to the plurality of secondary devices, where the call transfer information is used to set call transfer for the plurality of secondary devices.

By setting call transfer, a secondary device can continue to perform a cooperative task in the cooperative network, so that when an incoming call arrives, the cooperative network can continue to perform cooperative work without being disturbed by the incoming call, and the cooperative network has desired robustness.

The call transfer information may be used to set call transfer numbers for the plurality of secondary devices respectively. When there is an incoming call for a secondary device, the incoming call may be transferred to a preset number, so that the secondary device can work normally in the cooperative network.

The call transfer information may be used to set a same call transfer number for the plurality of secondary devices. When there is an incoming call for any one of the plurality of secondary devices, the incoming call is transferred to the preset call transfer number.

However, when there are incoming calls for two or more secondary devices simultaneously, it is not enough to set only one call transfer number. Therefore, the call transfer information may be used to set two or more call transfer numbers for the plurality of devices. Further, the call transfer information may be used to set a call transfer number for each of the plurality of devices. In this way, it can be ensured that each secondary device can smoothly perform call transfer when an incoming call arrives.

In some embodiments, a call transfer number may alternatively be preset for the primary device. In this way, when there is an incoming call for the primary device, the incoming call can be transferred to the preset number, thereby ensuring that the primary device can continue to perform a cooperative task.

The primary device plays a more important role in the cooperative network. Therefore, when there is an incoming call for the primary device, the incoming call is transferred to the preset number, and the primary device is not disturbed by the incoming call but continues to perform cooperative work, so that the cooperative network has desired robustness.

To enable each terminal device in a cooperative network to achieve a better sound effect during cooperative playing or cooperative sound recording, this application further provides a multi-terminal cooperative working method.

The method includes: sending, by a primary device, networking information to a plurality of secondary devices, where the networking information is used to establish a cooperative network between the primary device and the plurality of secondary devices, and the primary device has permission to manage the cooperative network;

receiving, by the primary device, networking confirmation information sent by the plurality of secondary devices, where the networking confirmation information is used to indicate that the secondary devices have accessed the cooperative network; and determining, by the primary device based on a quantity of devices included in the cooperative network and/or physical distances between devices in the cooperative network, a sound channel to be configured for each of the plurality of secondary devices.

In some embodiments, the configuring, by the primary device, a sound channel for a device in the cooperative network based on a quantity of devices included in the cooperative network and/or physical distances between devices in the cooperative network specifically includes the following two cases.

First Case:

The primary device evenly allocates, based on the quantity of devices included in the cooperative network, the devices in the cooperative network to a plurality of preset sound channels, so that quantities of devices in symmetrical sound channels are the same.

When the quantities of devices in the symmetrical sound channels are the same, sound volumes of the symmetrical sound channels can be balanced to improve subjective quality of sound.

Figure 7:
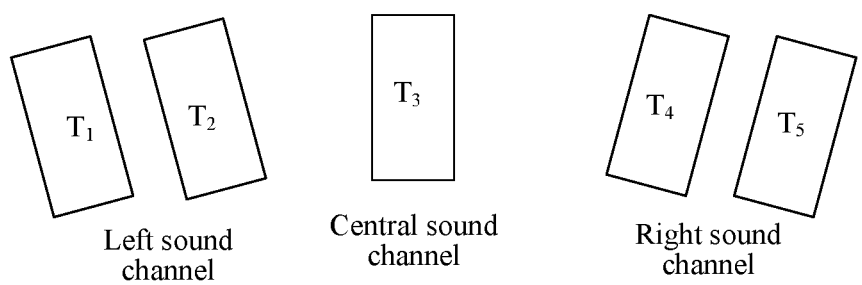
FIG. 7 is a schematic diagram of sound channels configured for various terminal devices in a cooperative network.

For example, as shown in FIG. 7, a total of five terminal devices $T_1$, $T_2$, $T_3$, $T_4$, and $T_5$ are included in a cooperative network, where $T_1$ is a primary device, and $T_2$, $T_3$, $T_4$, and $T_5$ are secondary devices. If it is determined that three sound channels (a left sound channel, a right sound channel, and a central sound channel) are configured for the cooperative network, $T_1$ and $T_2$ may be allocated to the left sound channel, $T_3$ may be configured in the central sound channel, and $T_4$ and $T_5$ may be configured in the right sound channel, so that a quantity of terminal devices configured in the left sound channel is the same as a quantity of terminal devices configured in the right sound channel. It should be understood that, the primary device $T_1$ herein may be configured in not only the left sound channel but also the central sound channel or the right sound channel, as long as it is ensured that the quantity of terminal devices configured in the left sound channel is the same as the quantity of terminal devices configured in the right sound channel.

Figure 8:
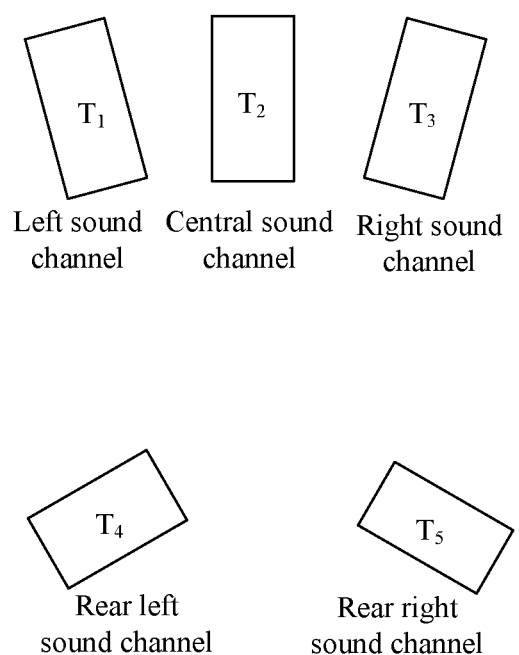
FIG. 8 is a schematic diagram of sound channels configured for various terminal devices in a cooperative network.

For example, as shown in FIG. 8, a total of five terminal devices $T_1$, $T_2$, $T_3$, $T_4$, and $T_5$ are included in a cooperative network, where $T_1$ is a primary device, and $T_2$, $T_3$, $T_4$, and $T_5$ are secondary devices. If it is determined that five sound channels (a left sound channel, a central sound channel, a right sound channel, a rear left sound channel, and a rear right sound channel) are configured for the cooperative network, because a quantity of terminal devices in the cooperative network is the same as a quantity of the sound channels, $T_1$, $T_2$, $T_3$, $T_4$, and $T_5$ may be configured respectively in the left sound channel, the central sound channel, the right sound channel, the rear left sound channel, and the rear right sound channel, so that a quantity of terminal devices configured in the left sound channel and the right sound channel is the same as a quantity of terminal devices configured in the rear left sound channel and the rear right sound channel.

Second case: The primary device allocates, to a same sound channel, devices whose physical distances are less than a preset distance in the cooperative network.

By allocating devices whose physical distances are relatively close to each other to a same sound channel, a good sound effect can be achieved during cooperative playing and cooperative sound recording.

After sound channels are configured for the devices in the cooperative network, if a quantity of devices in the cooperative network has changed, for example, if a device exits from the cooperative network or a new device joins the cooperative network, each device in the cooperative network may be continuously adjusted, so that quantities of terminal devices configured in symmetrical sound channels are kept consistent.

In one embodiment, when the quantity of devices in the cooperative network has changed, the primary device reallocates a sound channel to at least one device in the cooperative network, so that quantities of devices in symmetrical sound channels in the cooperative network are the same.

When the quantity of devices in the cooperative network has changed, the sound channel configured for each secondary device in the cooperative network is adjusted, so that the quantities of devices in symmetrical sound channels are the same. In this way, after the quantity of devices has changed, there is still a desired sound effect when each device in the cooperative network performs cooperative playing or cooperative sound recording.

Figure 9:
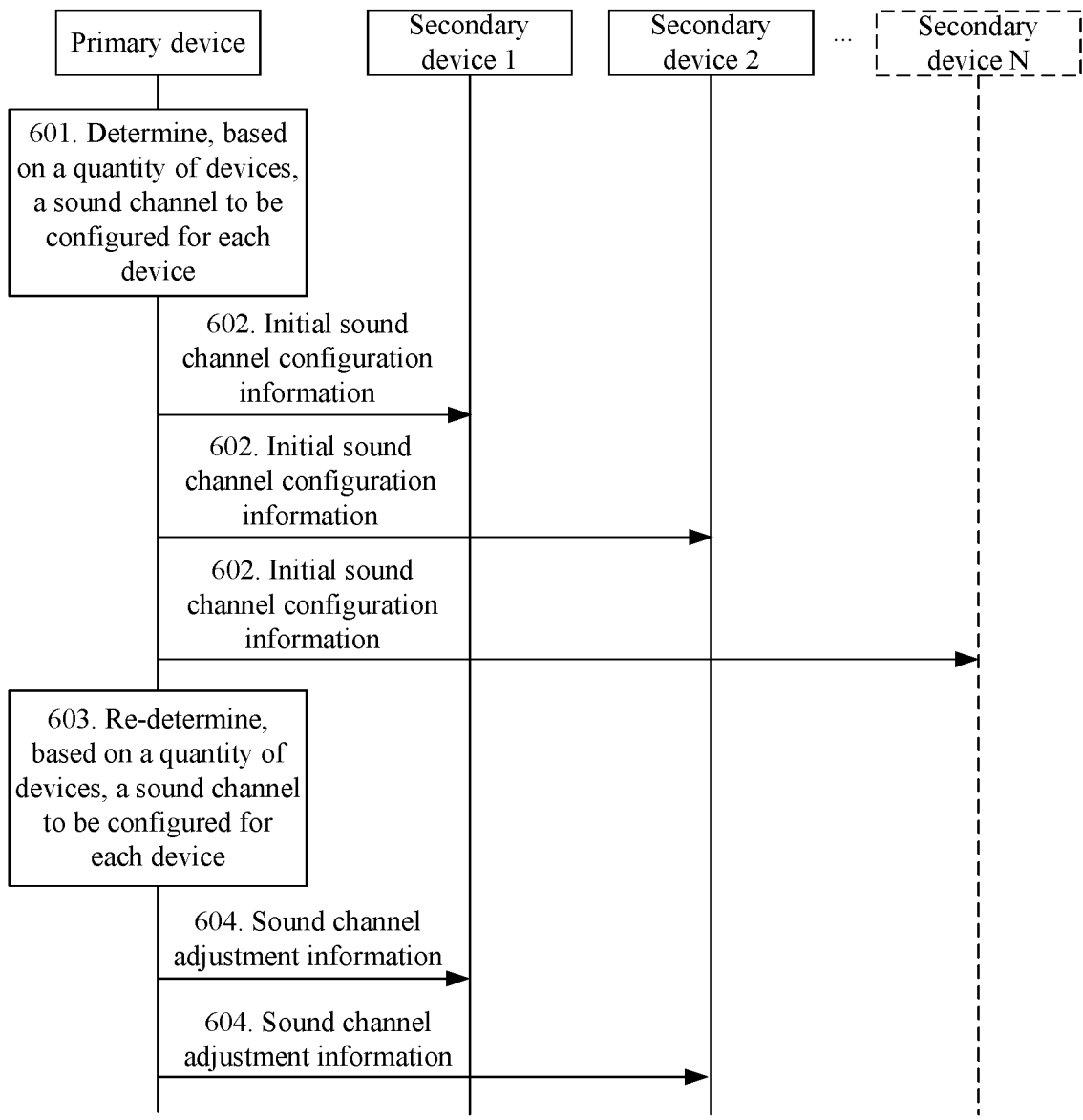
FIG. 9 is a schematic flowchart of a multi-terminal cooperative working method according one embodiment.
Figure 10:
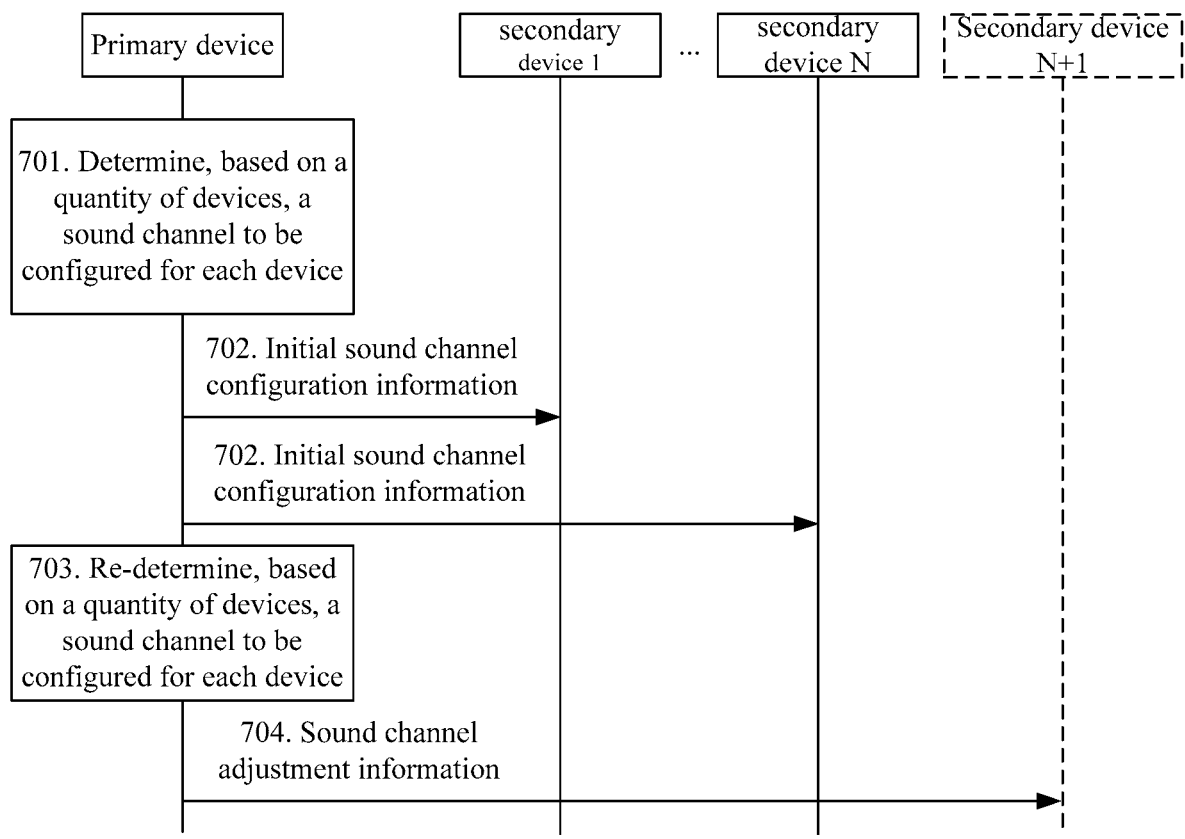
FIG. 10 is a schematic flowchart of a multi-terminal cooperative working method according one embodiment.

The following describes in detail, with reference to FIG. 9 and FIG. 10 respectively, how to adjust a configuration of a sound channel in a cooperative network when a quantity of devices in the cooperative network decreases or increases.

As shown in FIG. 9, a process in which the primary device configures sound channels and reallocates a sound channel when a secondary device exits from the cooperative network specifically includes the following steps.

601. The primary device determines, based on a quantity of devices, a sound channel to be configured for each device.

602. The primary device sends initial sound channel configuration information to each device.

It should be understood that the initial sound channel configuration information herein may include the sound channel to be configured for each device in the cooperative network. In this case, the initial sound channel configuration information received by each secondary device is the same. In addition, the initial sound channel configuration information received by each secondary device may alternatively include only a sound channel to be configured for this device. In this case, the initial sound channel configuration information received by each secondary device varies.

When a secondary device N exits from the cooperative network, step 603 and step 604 continue to be performed.

603. The primary device re-determines, based on a quantity of devices, a sound channel to be configured for each device.

604. The primary device sends sound channel adjustment information to each secondary device.

It should be understood that, in step 604, the primary device may send the sound channel adjustment information to each secondary device in the cooperative network, or may send the sound channel adjustment information only to a secondary device whose sound channel needs to be adjusted.

For example, as shown in FIG. 7, when $T_2$ exits from the cooperative network, the primary device determines to adjust $T_3$ from a central sound channel to a left sound channel, so that a quantity of terminal devices in the left sound channel still remains unchanged. In this case, the primary device may send a sound channel adjustment message to all secondary devices, where the sound channel adjustment message indicates that $T_3$ has been adjusted from the central sound channel to the left sound channel. In some embodiments, the primary device may send the sound channel adjustment message only to a secondary device whose sound channel needs to be adjusted.

As shown in FIG. 10, a process in which the primary device configures sound channels and reallocates a sound channel when a secondary device exits from the cooperative network specifically includes the following steps.

701. The primary device determines, based on a quantity of devices, a sound channel to be configured for each device.

702. The primary device sends initial sound channel configuration information to each device.

When a secondary device N+1 joins the cooperative network, step 703 and step 704 continue to be performed.

703. The primary device re-determines, based on a quantity of devices, a sound channel to be configured for each device.

704. The primary device sends sound channel adjustment information to a secondary device N+1.

It should be understood that, in step 704, if a sound channel originally configured for a secondary device in the cooperative network remains unchanged, the primary device may send the sound channel adjustment information only to a newly joined secondary device. When a sound channel originally configured for a secondary device in the cooperative network needs to be adjusted, the primary device sends the sound channel adjustment information to the secondary device whose sound channel configuration needs to be adjusted and a newly joined secondary device.

In some embodiments, regardless of whether a sound channel originally configured for a secondary device in the cooperative network needs to be adjusted, the primary device sends the sound channel adjustment information to all secondary devices (including a newly joined secondary device) in the cooperative network.

For example, as shown in FIG. 8, when a new terminal device joins the cooperative network, the primary device may directly allocate the new terminal device to a central sound channel. In addition, the primary device may alternatively adjust $T_2$ from the central sound channel to a left sound channel, to allocate the new terminal device to a central sound channel.

In some embodiments, when the cooperative network is a K-tree network, devices in each of K trees may be allocated to a same sound channel, where K is an integer greater than 1.

In an embodiment, the method shown in FIG. 2 further includes: sending, by the primary device, sound channel configuration indication information to the plurality of secondary devices, where the sound channel configuration indication information received by any one of the plurality of secondary devices is used to indicate, on a display interface of any one of the secondary devices, a location at which any one of the secondary devices needs to be placed and/or a direction in which any one of the secondary devices needs to be placed during sound channel configuration.

By indicating, on the display interface, a location at which a secondary device needs to be placed and/or a direction in which the secondary device needs to be placed during sound channel configuration, a user can be instructed simply and conveniently to operate the secondary device to complete sound channel adjustment.

Figure 11:
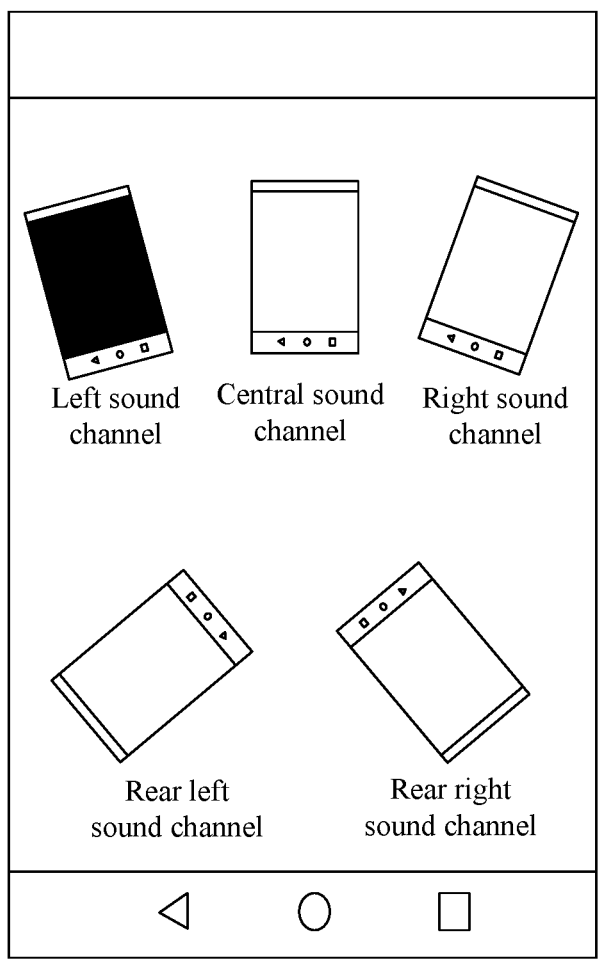
FIG. 11 is a schematic diagram of a sound channel configuration interface of a terminal device.

As shown in FIG. 11, after a secondary device receives the sound channel configuration indication information, a display interface of the secondary device shows that a left sound channel is allocated to the secondary device; and the display interface further shows that the secondary device needs to be placed at a position in an upper left corner of the entire cooperative network. In addition, a direction in which the secondary device needs to be placed is further displayed on the display interface.

The foregoing describes a multi-terminal cooperative working method in the embodiments of this application in detail from a perspective of a primary device with reference to FIG. 1 to FIG. 11. The following describes a multi-terminal cooperative working method in the embodiments of this application from a perspective of any one of secondary devices. It should be understood that, the multi-terminal cooperative working method in the embodiments of this application described from the perspective of any one of secondary devices corresponds to the foregoing multi-terminal cooperative working method in the embodiments of this application described from the perspective of a primary device. Therefore, for brevity, repeated description is omitted below as appropriate.

This application provides a multi-terminal cooperative working method. The method includes: receiving, by a first secondary device, networking information sent by a primary device, where the networking information is used to establish a cooperative network between the primary device and a plurality of secondary devices, the first secondary device is any one of the plurality of secondary devices, and the primary device has permission to manage the cooperative network; sending, by the first secondary device, networking confirmation information to the primary device, where the networking confirmation information is used to indicate that the first secondary device has accessed the cooperative network; and receiving, by the first secondary device, configuration information sent by the primary device, where the configuration information is used to instruct to switch, based on a preset management permission switching mechanism when the primary device becomes abnormal or the primary device exits from the cooperative network, the permission to manage the cooperative network.

Herein, by sending the configuration information to the secondary devices, the primary device can complete switching of the management permission based on the preset mechanism when the primary device becomes abnormal; and can clear a secondary device from the cooperative network when the secondary device becomes abnormal. In other words, regardless of whether the primary device or a secondary device becomes abnormal, there is a corresponding processing mechanism in this application. Therefore, this application can improve robustness of the cooperative network.

In some embodiments, in an embodiment, the method further includes: receiving, by the first secondary device, a candidate device list sent by the primary device, where the candidate device list is obtained by: selecting, by the primary device based on device capability information, at least one candidate device whose device capability meets a preset requirement from the plurality of secondary devices; and sequencing the at least one candidate device.

Compared with a way of directly determining a device as a standby device, candidate devices can be selected more properly through comprehensive consideration of capability information of each secondary device, and then a more suitable candidate device can be used to replace the primary device when the primary device becomes abnormal or needs to exit from the network.

In some embodiments, the primary device may determine the candidate device list in the following steps:

(1) The primary device obtains device capability information of a plurality of secondary devices.

(2) The primary device selects, based on the device capability information, at least one candidate device whose device capability meets a preset requirement from the plurality of secondary devices.

(3) The primary device sequences the at least one candidate device to obtain a candidate device list, where a target candidate device in the candidate device list is configured to take over the management permission of the primary device when the primary device becomes abnormal or the primary device exits from the cooperative network, and the target candidate device is a candidate device selected from the at least one candidate device in the candidate device list based on a sequencing order of the candidate device list.

(4) The primary device sends the candidate device list to the plurality of secondary devices.

Further, the sequencing, by the primary device, the at least one candidate device to obtain a candidate device list specifically includes:

determining, by the primary device, a device capability of the at least one candidate device based on device capability information of the at least one candidate device; and sequencing, by the primary device, the at least one candidate device in ascending or descending order of device capabilities, to obtain the candidate device list.

The candidate devices are sequenced based on device capabilities, and a target candidate device to replace the primary device can be quickly found, thereby simplifying complexity of device switchover.

The device capability information includes at least one of a central processing unit CPU operating speed of a device, a memory capacity of the device, remaining power of the device, a power consumption speed of the device, and a communication capability of the device.

In one embodiment, the primary device clears the first secondary device from the cooperative network when at least one of the following conditions occurs on the first secondary device:

a transmission delay between the first secondary device and the primary device exceeds a preset delay;

a distance between the first secondary device and the primary device exceeds a preset distance;

a version of an operating system is earlier than a preset version;

available power is lower than preset power; and an available resource does not meet a preset requirement.

In one embodiment, when there is an incoming call for the first secondary device, the first secondary device transfers the incoming call to a preset number.

By setting call transfer, a secondary device can continue to perform a cooperative task in the cooperative network, so that when an incoming call arrives, the cooperative network can continue to perform cooperative work without being disturbed by the incoming call, and the cooperative network has desired robustness.

The call transfer information may be used to set a same call transfer number for the plurality of secondary devices. When there is an incoming call for any one of the plurality of secondary devices, the incoming call is transferred to the preset call transfer number.

However, when there are incoming calls for two or more secondary devices simultaneously, it is not enough to set only one call transfer number. Therefore, the call transfer information may be used to set two or more call transfer numbers for the plurality of devices. Further, the call transfer information may be used to set a call transfer number for each of the plurality of devices. In this way, it can be ensured that each secondary device can smoothly perform call transfer when an incoming call arrives.

The following describes different mechanisms of the multi-terminal cooperative working method in the embodiments of this application in detail separately with reference to specific examples.

Example 1: Call Transfer Setting

When devices in a cooperative network perform a cooperative task together, if there is an incoming call for a device suddenly, selecting to answer the call may cause the device to exit from the cooperative network and cause the cooperative network to fail to normally perform the cooperative task.

For example, when the devices in the cooperative network are cooperatively playing music, there is an incoming call for a device suddenly. If selecting to answer the call, the device cannot continue to play music cooperatively with other devices, and as a result, a function of the entire cooperative network is affected.

Therefore, a call transfer mechanism needs to be set, to set call transfer numbers for the devices in the cooperative network. In this way, when there is an incoming call for a device in the cooperative network, the incoming call may be transferred to a preset call transfer number, thereby ensuring that the device in the cooperative network works normally.

During the setting of call transfer numbers for the devices in the cooperative network, because there is a relatively small possibility that incoming calls simultaneously arrive for the devices in the cooperative network, a same call transfer number may be set for all the devices in the cooperative network. In this way, when there is an incoming call for any device in the cooperative network, the incoming call is transferred to the call transfer number.

During the setting of call transfer numbers for the devices in the cooperative network, to ensure that all devices can perform call transfer when incoming calls arrive simultaneously, a call transfer number may be set for each device in the cooperative network. In this way, when there is an incoming call for a device, the incoming call needs to be transferred only to a call transfer number corresponding to the device. It should be understood that, by setting a call transfer number for each device in the cooperative network, robustness of performing cooperative work by the devices in the cooperative network can be improved. The cooperative network can work normally, regardless of how many devices for which incoming calls arrive simultaneously.

During the setting of call transfer numbers for the devices in the cooperative network, if a call transfer number is set for each device in the cooperative network, complexity of the solution increases inevitably. Therefore, in consideration of robustness of the cooperative system and complexity of the solution, during the setting of call transfer numbers for the devices in the cooperative network, one call transfer number may be set for several devices, so that when there are incoming calls for the devices, the incoming calls can be transferred to the call transfer number corresponding to the devices. For example, if a total of six devices are included in the cooperative network, a first call transfer number may be set for three of the devices, and a second call transfer number may be set for the other three devices.

A terminal device corresponding to the foregoing call transfer number may be another terminal device outside the cooperative network.

It should be understood that, when there is an incoming call for a device in the cooperative network, whether the incoming call is to be transferred to a preset call transfer number may be displayed on a display interface of the device for a user's selection. If the incoming call is relatively important, the user may directly select to answer the call. In this case, for system stability, the device may be first cleared from the cooperative network. After the user answers the call, the device may rejoin the cooperative network.

Example 2: Standby Primary Mode

Figure 12:
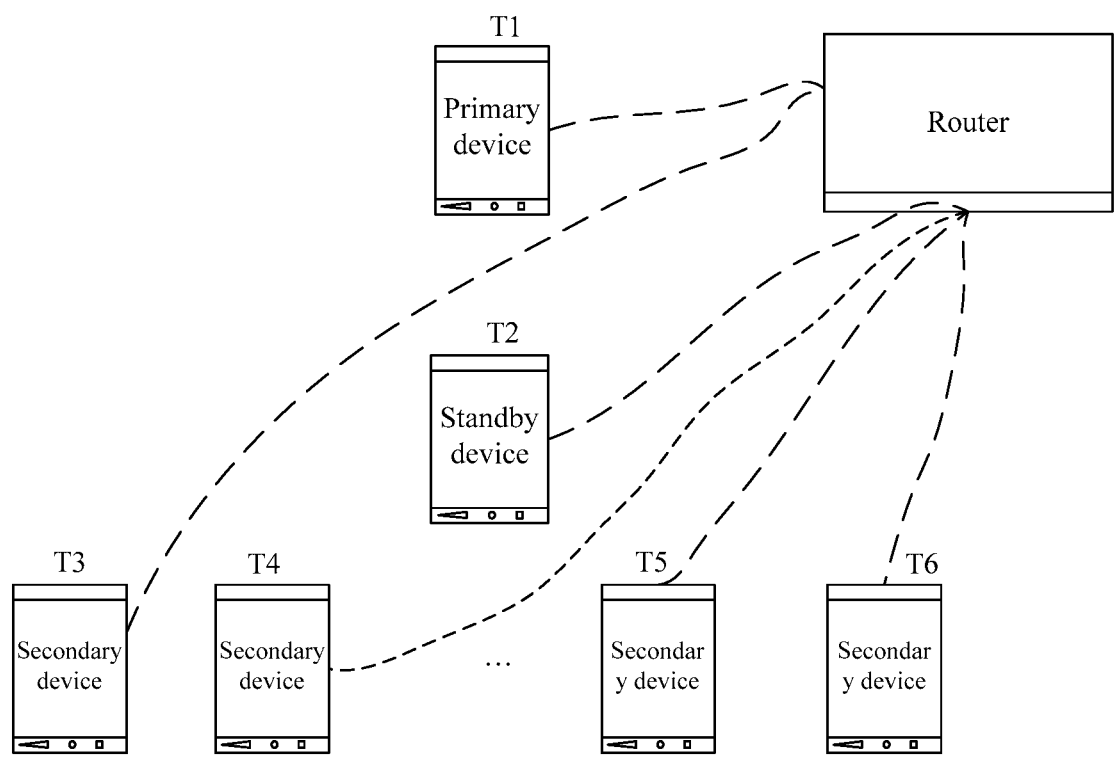
FIG. 12 is a schematic diagram of a cooperative network.

As shown in FIG. 12, a plurality of terminal devices $T_1$, $T_2$, $T_3$, $T_4$, $T_5$, and $T_6$ form a cooperative network through networking by using a router, where $T_1$ is a primary device. To ensure robustness of the cooperative system, $T_2$ may be preset as a standby device in the plurality of secondary devices. When the primary device becomes abnormal or needs to exit from the cooperative network, the standby device performs switchover to become a new primary device. A process of establishment and working of a cooperative system is described below in detail by using multi-terminal cooperative playing as an example.

Figure 13:
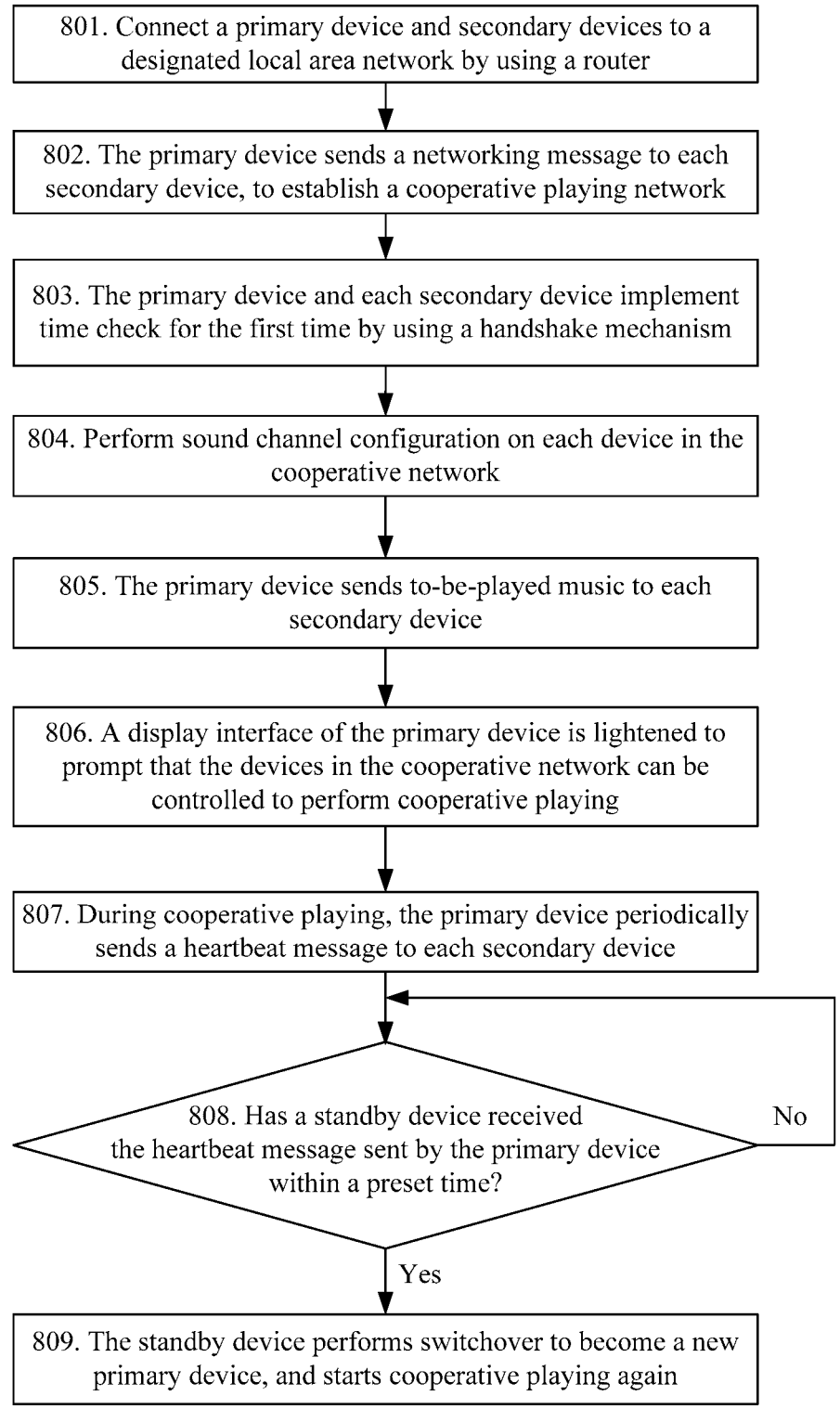
FIG. 13 is a schematic flowchart of a multi-terminal cooperative working method according one embodiment.

As shown in FIG. 13, an example process of establishment and working of a cooperative system (which may also be referred to as a cooperative network) includes the following steps.

801. Connect a primary device ($T_1$) and secondary devices ($T_2$, $T_3$, $T_4$, $T_5$, and $T_6$) to a designated local area network (local area network, LAN) by using a router.

It should be understood that, after the primary device and the secondary devices are connected to the LAN, a corresponding internet protocol (internet protocol, IP) address may be further allocated to each device.

$T_2$ is not only a secondary device in the cooperative network but also a standby device in the cooperative network.

802. The primary device sends networking information to each secondary device, to establish a cooperative playing network.

A specific manner of establishing a cooperative playing network by using networking information is not limited in this application. Various existing networking manners may be used to establish a cooperative playing network.

803. The primary device and each secondary device implement time check for the first time by using a handshake mechanism.

In step 803, the primary device and each secondary device may implement the time check for the first time by sending a handshake message to each other. Specifically, the primary device and the secondary devices may implement the time check for the first time through three times of handshake message sending to each other.

804. Perform sound channel configuration on each device in the cooperative network.

It should be understood that, the sound channel configuration herein may mean that the primary device and each secondary device are allocated to a plurality of sound channels. In this way, during cooperative playing, each device may perform cooperative playing based on a configured sound channel.

In some embodiments, during sound channel configuration, the primary device may perform sound channel configuration for each device in the cooperative network, or sound channel configuration may be manually performed on each device in the cooperative network.

During sound channel configuration, sound channel configuration may be flexibly performed based on a quantity of devices in the cooperative network (a sum of quantities of the primary device and the secondary devices) and distances between the devices in the cooperative network.

In some embodiments, during sound channel configuration, the standby device and the primary device may be configured in a same sound channel. In this way, when the primary device exits from the network and the standby device performs switchover to become a new primary device, there is a relatively minor impact on cooperative playing.

805. A display interface of the primary device is lightened to prompt that the devices in the cooperative network can be controlled to perform cooperative playing.

It should be understood that, when the display interface of the primary device is lightened, it indicates that the primary device has permission to control the cooperative network. In this case, display interfaces of other devices in the cooperative network should be gray, that is, the other devices cannot control other devices to perform cooperative playing.

806. The primary device sends to-be-played music to each secondary device.

In some embodiments, the primary device may directly send all of the to-be-played music to each secondary device, or may send the to-be-played music to each secondary device frame by frame.

In some embodiments, when the cooperative system performs cooperative sound recording, the primary device may receive a recorded file recorded by each secondary device; and when receiving a recorded file, the primary device may alternatively receive a recorded file sent by a secondary device frame by frame.

807. During cooperative playing, the primary device periodically sends a heartbeat message to each secondary device.

The heartbeat message includes a recent play timestamp.

808. A standby device determines whether the heartbeat message sent by the primary device has been received within a preset time.

If the standby device determines that the heartbeat message sent by the primary device has not been received within the preset time, step 809 is performed. If the standby device determines that the heartbeat message sent by the primary device has been received within the preset time, step 808 continues to be performed.

809. The standby device performs switchover to become a new primary device, and starts cooperative playing again.

A specific process in which the standby device $T_2$ performs switchover to become a new primary device and starts cooperative playing again is as follows:

(1) A display interface of the standby device $T_2$ is lightened, and a play timestamp stored from a recently received heartbeat message is extracted.

(2) The standby device $T_2$ sends a restart message to other secondary devices, where the restart message is used to instruct the other secondary devices to stop playing.

(3) The standby device $T_2$ implements time check again between devices through the handshake mechanism.

(4) The standby device $T_2$ re-controls, based on the play timestamp after waiting for the preset time, the other secondary devices to start playing.

During the foregoing playing process, if everything is normal, a next song is automatically switched to, or manually switched to on the display interface of the standby device.

Example 3: Mechanism for Inheriting the Management Permission of the Primary Device To ensure system robustness, the primary device may select at least one candidate device from the secondary devices based on capability information of the secondary devices, and obtain a candidate device list including the at least one candidate device. When the primary device becomes abnormal or needs to exit from the cooperative network, the primary device can transfer its management permission to a secondary device in the candidate standby list, thereby ensuring stable operation of the cooperative system.

Figure 14:
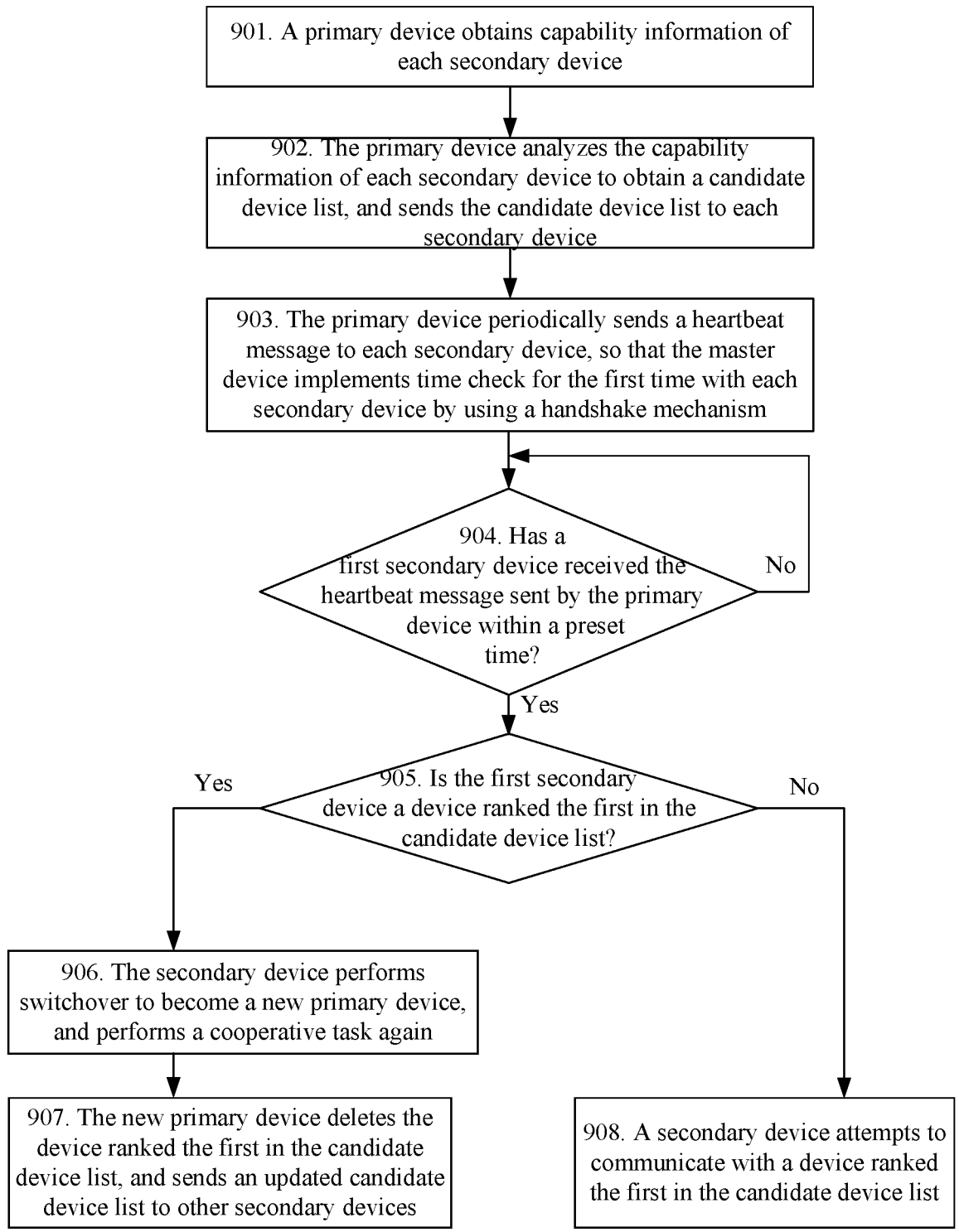
FIG. 14 is a schematic flowchart of a multi-terminal cooperative working method according one embodiment.

As shown in FIG. 14, transferring of the management permission of the primary device by using a mechanism for inheriting the management permission of the primary device mainly includes the following process.

901. A primary device obtains capability information of each secondary device.

The capability information of the device may include information, such as a CPU operating speed, a memory capacity, remaining battery power, a power consumption speed, and a communication capability.

In some embodiments, when obtaining the capability information of each secondary device, the primary device may obtain the capability information of each secondary device by receiving capability information actively reported by each secondary device.

In some embodiments, the primary device may send capability report indication information to each secondary device, so that each secondary device sends its own capability information to the primary device after receiving the capability report indication information sent by the primary device.

902. The primary device analyzes the capability information of each secondary device to obtain a candidate device list, and sends the candidate device list to each secondary device.

When determining the candidate device list, the primary device may determine a sequence of the candidate device list based on capabilities. A secondary device whose capability is relatively strong is disposed at a front location in the candidate device list, and a secondary device whose capability is relatively weak is disposed at a back location in the candidate list.

In addition, network address information and the like corresponding to each secondary device is also recorded in the candidate device list, for use during switchover of a secondary device for the secondary device to become a primary device. In addition, the primary device periodically obtains the capability information of each secondary device, and updates the candidate device list, so that a relatively proper candidate device can be selected even when a quantity of devices has changed or device capabilities have changed.

903. The primary device periodically sends a heartbeat message to each secondary device.

For example, the primary device may send a heartbeat message to each secondary device every 3 seconds.

The secondary device may determine, based on whether the heartbeat message from the primary device has been received within a preset time, whether the primary device becomes abnormal or whether the primary device has exited from the network.

904. A first secondary device determines whether the heartbeat message sent by the primary device has been received within a preset time.

The first secondary device is any one of the plurality of secondary devices.

If the first secondary device determines that the heartbeat message sent by the primary device has not been received within the preset time, step 905 is performed. If the first secondary device determines that the heartbeat message sent by the primary device has been received within the preset time, step 904 continues to be performed.

905. The first secondary device determines whether the first secondary device is a device ranked first in the candidate device list.

If the first device is a device ranked first in the candidate device list in step 905, step 906 and step 907 are performed; or if the first device is not a device ranked first in the candidate device list, step 908 is performed.

It should be understood that, when the candidate device list is sequenced in descending order of capabilities, each secondary device needs to determine whether itself is a device ranked first in the candidate device list (where the device ranked first is equivalent to a standby device). When the candidate device list is sequenced in ascending order of capabilities, each secondary device needs to determine whether itself is a device ranked last in the candidate device list (where the device ranked last is equivalent to a standby device).

906. The secondary device performs switchover to become a new primary device, and performs a cooperative task again.

907. The new primary device deletes the device ranked first in the candidate device list, and sends an updated candidate device list to other secondary devices.

908. A secondary device attempts to communicate with a device ranked first in the updated candidate device list.

In step 908, the secondary device may alternatively wait to receive networking information sent by the new primary device.

Each terminal device in the foregoing cooperative system may specifically include: a device capability obtaining module, a candidate device analysis module, and a heartbeat detection module. For the primary device, a device capability obtaining module of the primary device may be configured to obtain capability information of each secondary device, a candidate device analysis module of the primary device can analyze the capability information of each secondary device, to obtain the candidate device list, and a heartbeat detection module of the primary device is configured to send a heartbeat message to other devices and detect heartbeat messages sent by the other devices.

Example 4: Robustness Mechanism for Sound Channel Configuration

Cooperative playing is used as an example herein. To achieve a better play effect, a sound channel of each device in the cooperative network may be configured. Specifically, sound channel configuration may be performed on the devices in the cooperative network based on a quantity of devices in the cooperative network, so that quantities of terminal devices allocated to symmetrical sound channels are the same, thereby ensuring a desired cooperative playing effect.

For example, when a total of five terminal devices are included in the cooperative network, the five terminal devices may be separately configured in different sound channels. For details, refer to Table 1. Terminal devices $T_1$, $T_2$, $T_3$, $T_4$, and $T_5$ in the cooperative network may be respectively configured in a left sound channel, a central sound channel, a right sound channel, a rear left sound channel, and a rear right sound channel, where a quantity of devices allocated to each sound channel is the same as that in another sound channel. Therefore, it can be ensured that a better play effect can be obtained when the cooperative network performs cooperative playing.

TABLE 1

| Sound channel | Left sound channel | Central sound channel | Right sound channel | Rear left sound channel | Rear right sound channel |
|---|---|---|---|---|---|
| Terminal device | $T_1$ | $T_2$ | $T_3$ | $T_4$ | $T_5$ |

When six terminal devices are included in the cooperative network, two of the terminal devices may be configured in the central sound channel, and one terminal device is configured in each of the other four sound channels, specifically as shown in Table 2.

TABLE 2

| Sound channel | Left sound channel | Central sound channel | Right sound channel | Rear left sound channel | Rear right sound channel |
|---|---|---|---|---|---|
| Terminal device | $T_1$ | $T_2$ and $T_6$ | $T_3$ | $T_4$ | $T_5$ |

When seven terminal devices are included in the cooperative network, two terminal devices may be allocated to the left sound channel and the right sound channel respectively, and one terminal device is allocated to each of the other sound channels, specifically as shown in Table 3.

TABLE 3

| Sound channel | Left sound channel | Central sound channel | Right sound channel | Rear left sound channel | Rear right sound channel |
|---|---|---|---|---|---|
| Terminal device | $T_1$ and $T_6$ | $T_2$ | $T_3$ and $T_7$ | $T_4$ | $T_5$ |

When eight terminal devices are included in the cooperative network, two terminal devices may be allocated to the left sound channel, the right sound channel, and the central sound channel respectively, and one terminal device is allocated to each of the other sound channels, specifically as shown in Table 4.

TABLE 4

| Sound channel | Left sound channel | Central sound channel | Right sound channel | Rear left sound channel | Rear right sound channel |
|---|---|---|---|---|---|
| Terminal device | $T_1$ and $T_6$ | $T_2$ and $T_8$ | $T_3$ and $T_7$ | $T_4$ | $T_5$ |

When nine terminal devices are included in the cooperative network, two terminal devices may be allocated to the left sound channel, the right sound channel, the rear left sound channel, and the rear right sound channel respectively, and one terminal device is allocated to the central sound channel, specifically as shown in Table 5.

TABLE 5

| Sound channel | Left sound channel | Central sound channel | Right sound channel | Rear left sound channel | Rear right sound channel |
|---|---|---|---|---|---|
| Terminal device | $T_1$ and $T_6$ | $T_2$ | $T_3$ and $T_7$ | $T_4$ and $T_8$ | $T_5$ and $T_9$ |

When ten terminal devices are included in the cooperative network, two terminal devices may be configured in each sound channel, specifically as shown in Table 6.

TABLE 6

| Sound channel | Left sound channel | Central sound channel | Right sound channel | Rear left sound channel | Rear right sound channel |
|---|---|---|---|---|---|
| Terminal device | $T_1$ and $T_6$ | $T_2$ and $T_{10}$ | $T_3$ and $T_7$ | $T_4$ and $T_8$ | $T_5$ and $T_9$ |

When the quantity of devices in the cooperative network has changed, sound channels may be reallocated based on the manners shown in Table 1 to Table 6.

(1) The Quantity of Terminal Devices has Changed from 5 to 6.

When the quantity of the terminal devices is 5, as shown in Table 1, one terminal device is included in each sound channel.

When the quantity of terminal devices has changed from 5 to 6, to ensure that quantities of devices in symmetrical sound channels (the left sound channel and the right sound channel, and the rear left sound channel and the rear right sound channel) are the same, a newly added terminal device $T_6$ is allocated to the central sound channel, and a user is prompted by a highlighted icon on an interface of $T_6$ to set the central sound channel for $T_6$. The user may dispose $T_6$ at a location near the central sound channel based on the prompt on the display interface of the device $T_6$.

When the quantity of terminal devices has changed from 5 to 6, this is equivalent to that, a sound channel configuration relationship shown in Table 1 has changed into a sound channel configuration relationship shown in Table 2.

(2) The Quantity of Terminal Devices has Changed from 6 to 7.

When the quantity of terminal devices is 6, as shown in Table 2, one terminal device is configured in each of the sound channels except for the central sound channel.

When the quantity of terminal devices has changed from 6 to 7, to ensure that quantities of devices in symmetrical sound channels are the same, the terminal device $T_6$ and a newly added terminal device $T_7$ are allocated to the left sound channel and the right sound channel respectively, a user is prompted by a highlighted icon on the interface of $T_6$ to set the left sound channel for $T_6$, and a user is prompted by a highlighted icon on an interface of $T_7$ to set the right sound channel for $T_7$. The users may dispose $T_6$ and $T_7$ at locations near the left sound channel and the right sound channel respectively based on the prompts on the display interfaces of the device $T_6$ and the terminal device $T_7$.

When the quantity of terminal devices has changed from 6 to 7, this is equivalent to that, the sound channel configuration relationship shown in Table 2 has changed into a sound channel configuration relationship shown in Table 3.

(3) The Quantity of Terminal Devices has Changed from 7 to 8.

When the quantity of terminal devices is 7, as shown in Table 3, one terminal device is configured in each of the central sound channel, the rear left sound channel, and the rear right sound channel, and two terminal devices are configured in both the left sound channel and the right sound channel.

When the quantity of terminal devices has changed from 7 to 8, to ensure that quantities of devices in symmetrical sound channels are the same, a newly added terminal device $T_5$ may be allocated to the central sound channel, and a user is prompted by a highlighted icon on an interface of $T_5$ to set the central sound channel for $T_5$. The user may dispose $T_5$ at a location near the central sound channel based on the prompt on the display interface of the device $T_8$.

When the quantity of terminal devices has changed from 7 to 8, this is equivalent to that, the sound channel configuration relationship shown in Table 3 has changed into a sound channel configuration relationship shown in Table 4.

(4) The Quantity of Terminal Devices has Changed from 8 to 9.

When the quantity of terminal devices is 8, as shown in Table 4, one terminal device is allocated to each of the rear left sound channel and the rear right sound channel, and two terminal devices are allocated to each of the other sound channels.

When the quantity of terminal devices has changed from 8 to 9, to ensure that quantities of devices in symmetrical sound channels are the same, the terminal device $T_8$ and a newly added terminal device $T_9$ are allocated to the rear left sound channel and the rear right sound channel respectively, a user is prompted by a highlighted icon on an interface of $T_8$ to set the rear left sound channel for $T_8$, and a user is prompted by a highlighted icon on an interface of $T_9$ to set the rear right sound channel for $T_9$. The users may dispose $T_8$ and $T_9$ at locations near the rear left sound channel and the rear right sound channel respectively based on the prompts on the display interfaces of the device $T_8$ and the terminal device $T_9$.

When the quantity of terminal devices has changed from 8 to 9, this is equivalent to that, the sound channel configuration relationship shown in Table 4 has changed into a sound channel configuration relationship shown in Table 5.

(5) The Quantity of Terminal Devices has Changed from 9 to 10.

When the quantity of terminal devices is 9, as shown in Table 5, two terminal devices are allocated to each of the sound channels except for the central sound channel.

When the quantity of terminal devices has changed from 9 to 10, to ensure that quantities of devices in symmetrical sound channels are the same, a newly added terminal device $T_{10}$ may be allocated to the central sound channel, and a user is prompted by a highlighted icon on an interface of $T_{10}$ to set the central sound channel for $T_{10}$. The user may dispose $T_{10}$ at a location near the central sound channel based on the prompt on the display interface of the device $T_{10}$.

When the quantity of terminal devices has changed from 9 to 10, this is equivalent to that, the sound channel configuration relationship shown in Table 5 has changed into a sound channel configuration relationship shown in Table 6.

Example 5: Exit Mechanism Based on Distance Detection

When a device (which may be a primary device or a secondary device) in a cooperative network is far away from another device in the cooperative network, a possibility of network jitter increases. In this case, to ensure network stability, the device may be cleared from the network. If the primary device is cleared, a standby device performs switchover to become a new primary device. If a secondary device is cleared, the primary device remains unchanged.

For example, when there is an incoming call for a device, if a user chooses to answer the call, in consideration of privacy, the user usually goes out of a room to answer the call. In this case, a distance from the device to another device in the cooperative network increases. When the distance increases to some extent, due to blocking of a routed signal by a wall, transmission time increases, and a probability of network jitter increases. Consequently, the device in the cooperative network cannot perform normal cooperative playing or cooperative sound recording. Therefore, when determining that a transmission delay of a device (which may be the primary device or a secondary device) is greater than a preset threshold, the primary device clears the device from the cooperative network.

Example 6: Mechanism for Switchover and Exit Based on a Resource Status

For a terminal device, operating stability of the terminal device depends on a current resource occupancy status of the terminal device to a great extent, and a resource occupancy status of each terminal device may also be exchanged in a process of periodically exchanging heartbeat messages, so as to determine whether to switch over a primary device or clear a secondary device.

When the primary device determines that its own resources are excessively occupied, for example, if memory occupancy is higher than a preset threshold and battery power is lower than preset power, the primary device determines to perform switchover to transfer permission to manage the cooperative network to a standby device.

When the primary device determines that resources of a secondary device are excessively occupied, for example, if memory occupancy is higher than a preset threshold and battery power is lower than preset power, the primary device clears the secondary device from the cooperative network.

When clearing a secondary device from the cooperative network, the primary device may send clearing information to the secondary device, where the clearing information is used to instruct the secondary device to exit from the cooperative network. After receiving the clearing information, the secondary device may display, on an interface, an icon concerning whether to exit from the cooperative network, so that a user performs a corresponding operation to determine to exit or not to exit from the cooperative network.

Example 7: Exit Mechanism when Both the Primary Device and the Standby Device are Abnormal When the primary device becomes abnormal, the standby device needs to perform switchover to become a new primary device. However, when the standby device has a fault and cannot normally perform switchover to become a primary device, if a secondary device still cannot receive a heartbeat message from the primary device in a preset time, the secondary device exits from the cooperative network. In other words, when both the primary device and the standby device are abnormal, because the cooperative network cannot continue to work, the secondary device then exits from the cooperative network.

The foregoing describes a multi-terminal cooperative working method in the embodiments of this application in detail with reference to FIG. 1 to FIG. 14. The following describes terminal devices in the embodiments of this application with reference to FIG. 15 and FIG. 16. It should be understood that the terminal devices in FIG. 15 and FIG. 16 can perform the multi-terminal cooperative working method in the embodiments of this application. For brevity, repeated description is omitted as appropriate in the following description of the terminal devices.

It should be understood that a terminal device 1000 in FIG. 15 and a terminal device 1100 described below are both primary devices in a cooperative network. In addition, in this application, a structure of a secondary device may be the same as that of the terminal device 1000 or the terminal device 1100.

Figure 15:
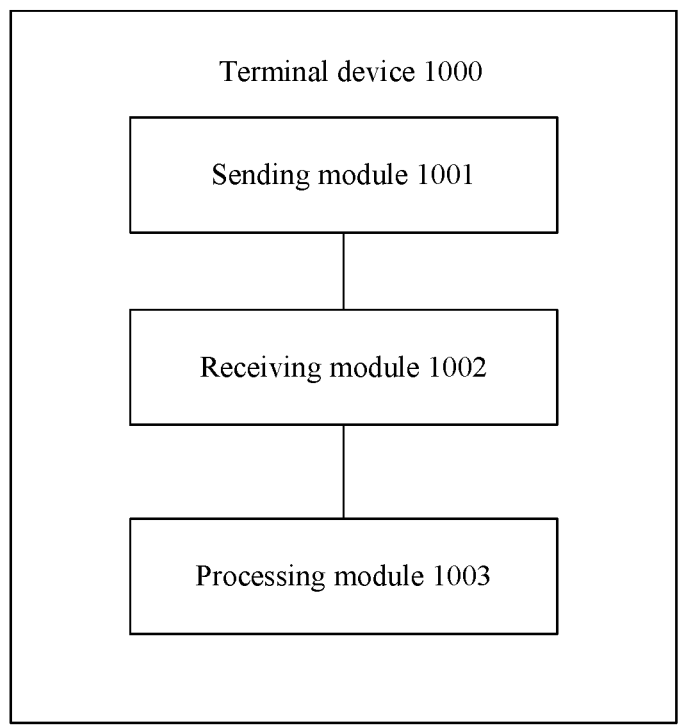
FIG. 15 is a schematic block diagram of a terminal device according one embodiment.

FIG. 15 is a schematic block diagram of a terminal device according one embodiment. The terminal device 1000 includes:

a sending module 1001, configured to send networking information to a plurality of secondary devices, where the networking information is used to establish a cooperative network between the terminal device 1000 and the plurality of secondary devices, and the terminal device 1000 has permission to manage the cooperative network;

a receiving module 1002, configured to receive networking confirmation information sent by the plurality of secondary devices, where the networking confirmation information is used to indicate that the secondary devices have accessed the cooperative network, and the sending module 1001 is further configured to send configuration information to the plurality of secondary devices separately, where the configuration information is used to instruct to switch, based on a preset management permission switching mechanism when the terminal device 1000 becomes abnormal or the terminal device exits from the cooperative network, the permission to manage the cooperative network; and a processing module 1003, configured to: when one of the plurality of secondary devices becomes abnormal, clear the secondary device from the cooperative network based on a preset clearing rule.

In this application, by sending the configuration information to the secondary devices, the terminal device (which is a primary device) can complete switching of the management permission based on the preset mechanism when the primary device becomes abnormal, and can clear a secondary device from the cooperative network when the secondary device becomes abnormal. In other words, regardless of whether the primary device or a secondary device becomes abnormal, there is a corresponding processing mechanism in this application. Therefore, this application can improve robustness of the cooperative network.

Optionally, in an embodiment, the processing module 1003 is further configured to: obtain device capability information of the plurality of secondary devices; select, based on the device capability information, at least one candidate device whose device capability meets a preset requirement from the plurality of secondary devices; and sequence the at least one candidate device to obtain a candidate device list, where a target candidate device in the candidate device list is configured to take over the management permission of the terminal device when the terminal device becomes abnormal or the terminal device exits from the cooperative network, and the target candidate device is a candidate device selected from the at least one candidate device in the candidate device list based on a sequencing order of the candidate device list.

Compared with a way of directly determining a device as a standby device, candidate devices can be selected more properly through comprehensive consideration of capability information of each secondary device, and then a more suitable candidate device can be used to replace the primary device when the primary device becomes abnormal or needs to exit from the network.

In some embodiments, in an embodiment, the processing module 1003 is specifically configured to: determine a device capability of the at least one candidate device based on device capability information of the at least one candidate device; and sequence the at least one candidate device in ascending or descending order of device capabilities, to obtain the candidate device list.

The candidate devices are sequenced based on device capabilities, and a target candidate device to replace the primary device can be quickly found, thereby simplifying complexity of device switchover.

In some embodiments, in an embodiment, the device capability information includes at least one of a central processing unit CPU operating speed of a device, a memory capacity of the device, remaining power of the device, a power consumption speed of the device, and a communication capability of the device.

In some embodiments, in an embodiment, the configuration information is specifically used to instruct a standby device preset in the plurality of secondary devices to take over, when the terminal device becomes abnormal or needs to exit from the cooperative network, the management permission of the terminal device.

When the primary device becomes abnormal or needs to exit from the cooperative network, the preset standby device takes over the management permission of the primary device, to ensure that the devices in the cooperative network can still work normally, thereby improving robustness of the cooperative network.

In some embodiments, in an embodiment, the processing module 1003 is specifically configured to: clear the secondary device from the cooperative network when at least one of the following conditions occurs on the secondary device:

a transmission delay between the secondary device and the terminal device exceeds a preset delay;

a distance between the secondary device and the terminal device exceeds a preset distance;

a version of an operating system is earlier than a preset version;

available power is lower than preset power; and an available resource does not meet a preset requirement.

When one of the foregoing conditions occurs on a secondary device, it may be considered that a device capability of the secondary device cannot satisfy a requirement for normal cooperative working. In this case, the secondary device whose device capability cannot satisfy the requirement is cleared from the cooperative network, to avoid an impact that would otherwise be caused by the secondary device whose device capability cannot satisfy the requirement on cooperative working of the entire cooperative network.

In some embodiments, in an embodiment, the sending module 1001 is further configured to: send call transfer information to the plurality of secondary devices, where the call transfer information is used to set call transfer for the plurality of secondary devices. By setting call transfer, a secondary device can continue to perform a cooperative task in the cooperative network, so that when an incoming call arrives, the cooperative network can continue to perform cooperative work without being disturbed by the incoming call, and the cooperative network has desired robustness.

The call transfer information may be used to set a same call transfer number for the plurality of secondary devices. When there is an incoming call for any one of the plurality of secondary devices, the incoming call is transferred to the preset call transfer number.

However, when there are incoming calls for two or more secondary devices simultaneously, it is not enough to set only one call transfer number. Therefore, the call transfer information may be used to set two or more call transfer numbers for the plurality of devices. Further, the call transfer information may be used to set a call transfer number for each of the plurality of devices. In this way, it can be ensured that each secondary device can smoothly perform call transfer when an incoming call arrives.

In some embodiments, in an embodiment, the processing module 1003 is further configured to: when there is an incoming call for the terminal device, transfer the incoming call to a preset number.

The primary device plays a more important role in the cooperative network. Therefore, when there is an incoming call for the primary device, the incoming call is transferred to the preset number, and the primary device is not disturbed by the incoming call but continues to perform cooperative work, so that the cooperative network has desired robustness.

Figure 16:
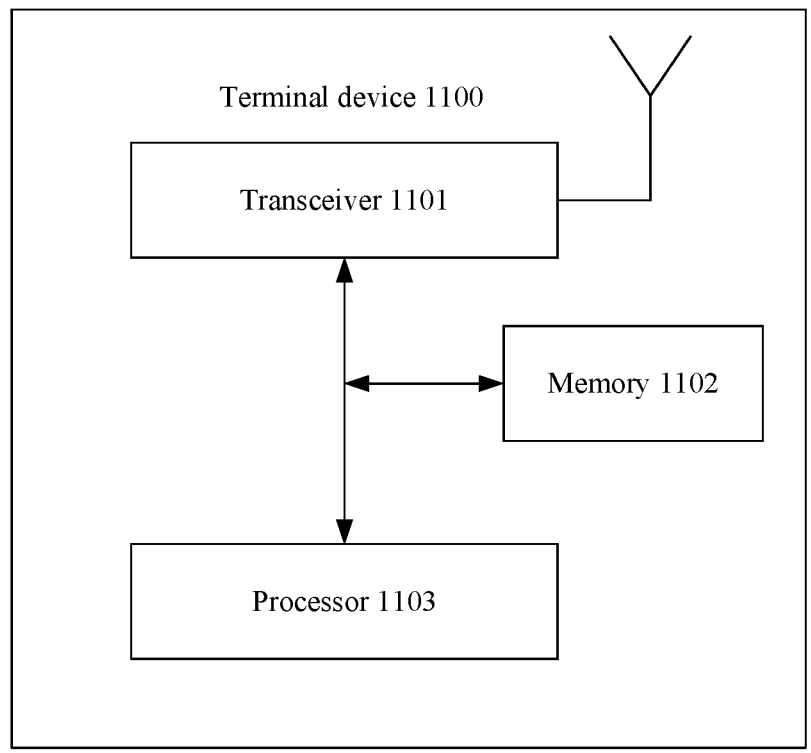
FIG. 16 is a schematic block diagram of a terminal device according one embodiment.

FIG. 16 is a schematic block diagram of a terminal device according one embodiment. The terminal device 1100 includes:

a transceiver 1101, where the transceiver 1101 is specifically configured to:

send networking information to a plurality of secondary devices, where the networking information is used to establish a cooperative network between the terminal device 1100 and the plurality of secondary devices, and the terminal device 1100 has permission to manage the cooperative network;

receive networking confirmation information sent by the plurality of secondary devices, where the networking confirmation information is used to indicate that the secondary devices have accessed the cooperative network; and send configuration information to the plurality of secondary devices separately, where the configuration information is used to instruct to switch, based on a preset management permission switching mechanism when the terminal device 1100 becomes abnormal or the terminal device 1100 exits from the cooperative network, the permission to manage the cooperative network;

a memory 1102, configured to store a program; and a processor 1103, where, when a program stored in the memory 1102 is executed, the processor 1103 is specifically configured to: when one of the plurality of secondary devices becomes abnormal, clear the secondary device from the cooperative network based on a preset clearing rule.

In this application, by sending the configuration information to the secondary devices, the terminal device (which is a primary device) can complete switching of the management permission based on the preset mechanism when the primary device becomes abnormal, and can clear a secondary device from the cooperative network when the secondary device becomes abnormal. In other words, regardless of whether the primary device or a secondary device becomes abnormal, there is a corresponding processing mechanism in this application. Therefore, this application can improve robustness of the cooperative network.

In some embodiments, in an embodiment, the processor 1103 is further configured to: obtain device capability information of the plurality of secondary devices; select, based on the device capability information, at least one candidate device whose device capability meets a preset requirement from the plurality of secondary devices; and sequence the at least one candidate device to obtain a candidate device list, where a target candidate device in the candidate device list is configured to take over the management permission of the terminal device when the terminal device becomes abnormal or the terminal device exits from the cooperative network, and the target candidate device is a candidate device selected from the at least one candidate device in the candidate device list based on a sequencing order of the candidate device list.

Compared with a way of directly determining a device as a standby device, candidate devices can be selected more properly through comprehensive consideration of capability information of each secondary device, and then a more suitable candidate device can be used to replace the primary device when the primary device becomes abnormal or needs to exit from the network.

In some embodiments, in an embodiment, the processor 1103 is specifically configured to: determine a device capability of the at least one candidate device based on device capability information of the at least one candidate device; and sequence the at least one candidate device in ascending or descending order of device capabilities, to obtain the candidate device list.

The candidate devices are sequenced based on device capabilities, and a target candidate device to replace the primary device can be quickly found, thereby simplifying complexity of device switchover.

In one embodiment, the device capability information includes at least one of a central processing unit CPU operating speed of a device, a memory capacity of the device, remaining power of the device, a power consumption speed of the device, and a communication capability of the device.

In one embodiment, the configuration information is specifically used to instruct a standby device preset in the plurality of secondary devices to take over, when the terminal device becomes abnormal or needs to exit from the cooperative network, the management permission of the terminal device.

The candidate devices are sequenced based on device capabilities, and a target candidate device to replace the primary device can be quickly found, thereby simplifying complexity of device switchover.

In one embodiment, the processor 1103 is configured to: clear the secondary device from the cooperative network when at least one of the following conditions occurs on the secondary device:

a transmission delay between the secondary device and the terminal device exceeds a preset delay;

a distance between the secondary device and the terminal device exceeds a preset distance;

a version of an operating system is earlier than a preset version;

available power is lower than preset power; and an available resource does not meet a preset requirement.

When one of the foregoing conditions occurs on a secondary device, it may be considered that a device capability of the secondary device cannot satisfy a requirement for normal cooperative working. In this case, the secondary device whose device capability cannot satisfy the requirement is cleared from the cooperative network, to avoid an impact that would otherwise be caused by the secondary device whose device capability cannot satisfy the requirement on cooperative working of the entire cooperative network.

In one embodiment, the transceiver 1101 is further configured to: send call transfer information to the plurality of secondary devices, where the call transfer information is used to set call transfer for the plurality of secondary devices.

By setting call transfer, a secondary device can continue to perform a cooperative task in the cooperative network, so that when an incoming call arrives, the cooperative network can continue to perform cooperative work without being disturbed by the incoming call, and the cooperative network has desired robustness.

The call transfer information may be used to set a same call transfer number for the plurality of secondary devices. When there is an incoming call for any one of the plurality of secondary devices, the incoming call is transferred to the preset call transfer number.

However, when there are incoming calls for two or more secondary devices simultaneously, it is not enough to set only one call transfer number. Therefore, the call transfer information may be used to set two or more call transfer numbers for the plurality of devices. Further, the call transfer information may be used to set a call transfer number for each of the plurality of devices. In this way, it can be ensured that each secondary device can smoothly perform call transfer when an incoming call arrives.

In one embodiment, the processor 1103 is further configured to: when there is an incoming call for the terminal device, transfer the incoming call to a preset number. The primary device plays a more important role in the cooperative network. Therefore, when there is an incoming call for the primary device, the incoming call is transferred to the preset number, and the primary device is not disturbed by the incoming call but continues to perform cooperative work, so that the cooperative network has desired robustness.

This disclosure further provides a computer readable medium. The computer readable medium stores program code to be executed by a device, where the program code includes an instruction used to perform the multi-terminal cooperative working method in the embodiments of this application.

Figure 17:
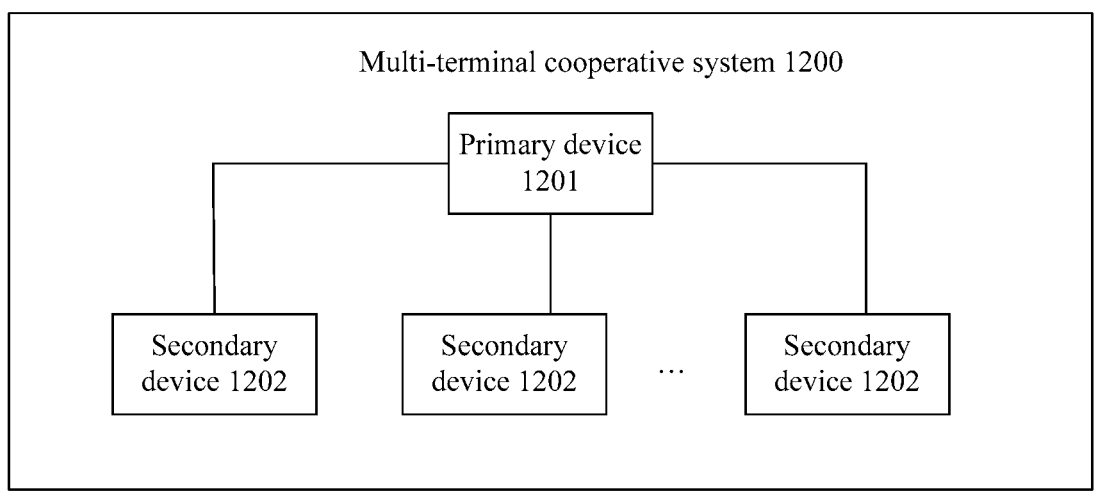
FIG. 17 is a schematic block diagram of a multi-terminal cooperative system according one embodiment.

FIG. 17 is a schematic block diagram of a multi-terminal cooperative system according one embodiment. The multi-terminal cooperative system 1200 includes a primary device 1201 and a plurality of secondary devices 1202. Specific functions of the primary device 1201 and the plurality of secondary devices 1202 are as follows:

The primary device 1201 sends networking information to the plurality of secondary devices 1202, where the networking information is used to establish a cooperative network between the primary device 1201 and the plurality of secondary devices 1202, and the primary device 1201 has permission to manage the cooperative network.

The plurality of secondary devices 1202 separately send networking confirmation information to the primary device 1201, where the networking confirmation information is used to indicate that the secondary devices have accessed the cooperative network.

The primary device 1201 sends configuration information to the plurality of secondary devices 1202 separately, where the configuration information is used to instruct to switch, based on a preset management permission switching mechanism when the primary device 1201 becomes abnormal or the primary device 1201 exits from the cooperative network, the permission to manage the cooperative network.

When the primary device 1201 becomes abnormal or the primary device exits from the cooperative network, the plurality of secondary devices 1202 switch, based on the preset management permission switching mechanism, the permission to manage the cooperative network.

When one of the plurality of secondary devices 1202 becomes abnormal, the primary device 1201 clears the secondary device from the cooperative network based on a preset clearing rule.

In this application, by sending the configuration information to the secondary devices, the primary device can complete switching of the management permission based on the preset mechanism when the primary device becomes abnormal; and can clear a secondary device from the cooperative network when the secondary device becomes abnormal. In other words, regardless of whether the primary device or a secondary device becomes abnormal, there is a corresponding processing mechanism in this application. Therefore, this application can improve robustness of the cooperative network.

It should be understood that the primary device 1201 in the multi-terminal cooperative system 1200 is equivalent to the foregoing terminal device 1000 or terminal device 1100. The multi-terminal cooperative system 1200 may be obtained by performing networking on the terminal device 1000 or the terminal device 1100 and another terminal device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the foregoing described apparatus embodiment is merely an example. For example, the unit division is merely logical function division and there may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for cooperative working between a plurality of terminal devices, comprising:
   sending, by a primary device, networking information to a plurality of secondary devices, wherein the networking information is configured to facilitate establishing a cooperative network between the primary device and the plurality of secondary devices, wherein the primary device has a permission to manage the cooperative network;
   receiving, by the primary device, networking confirmation information sent by the plurality of secondary devices, wherein the networking confirmation information indicating that the secondary devices have accessed the cooperative network;
   sending, by the primary device, configuration information to the plurality of secondary devices separately, wherein the configuration information is configured to instruct to switch, based on a preset management permission switching mechanism when the primary device becomes abnormal or the primary device exits from the cooperative network, the permission to manage the cooperative network; and
   clearing, by the primary device when one of the plurality of secondary devices becomes abnormal, the secondary device from the cooperative network based on a preset clearing rule.

2. The method according to claim 1, wherein the method further comprises:
   obtaining, by the primary device, device capability information of the plurality of secondary devices;
   selecting, by the primary device based on the device capability information, at least one candidate device whose device capability meets a preset requirement from the plurality of secondary devices;
   sequencing, by the primary device, the at least one candidate device to obtain a candidate device list, wherein a target candidate device in the candidate device list is configured to take over the management permission of the primary device when the primary device becomes abnormal or the primary device exits from the cooperative network, and the target candidate device is a candidate device selected from the at least one candidate device in the candidate device list based on a sequencing order of the candidate device list; and
   sending, by the primary device, the candidate device list to the plurality of secondary devices.

3. The method according to claim 2, wherein sequencing, by the primary device, the at least one candidate device to obtain a candidate device list comprises:
 determining, by the primary device, a device capability of the at least one candidate device based on device capability information of the at least one candidate device; and
 sequencing, by the primary device, the at least one candidate device in ascending or descending order of device capabilities, to obtain the candidate device list.

4. The method according to claim 2, wherein the device capability information comprises at least one of a central processing unit (CPU) speed of a device, a memory capacity of the device, remaining power of the device, a power consumption speed of the device, and a communication capability of the device.

5. The method according to claim 1, wherein the configuration information is configured to instruct a standby device preset in the plurality of secondary devices to take over, when the primary device becomes abnormal or is to exit from the cooperative network, the management permission of the primary device.

6. The method according to claim 1, wherein clearing, by the primary device when one of the plurality of secondary devices becomes abnormal, the secondary device from the cooperative network based on a preset clearing rule comprises:
 clearing the secondary device from the cooperative network when at least one of the following conditions occurs on the secondary device:
 a transmission delay between the secondary device and the primary device exceeds a preset delay;
 a distance between the secondary device and the primary device exceeds a preset distance;
 a version of an operating system is earlier than a preset version;
 available power is lower than preset power; and
 an available resource does not meet a preset requirement.

7. The method according to claim 1, wherein the method further comprises:
 sending, by the primary device, call transfer information to the plurality of secondary devices, wherein the call transfer information is configured for setting call transfer for the plurality of secondary devices.

8. The method according to claim 1, wherein the method further comprises:
 when there is an incoming call for the primary device, transferring the incoming call to a preset number.

9. A terminal device, comprising:
 a sending module, configured to send networking information to a plurality of secondary devices, wherein the networking information is configured to facilitate establishing a cooperative network between the terminal device and the plurality of secondary devices, wherein the terminal device has a permission to manage the cooperative network; and
 a receiving module, configured to receive networking confirmation information sent by the plurality of secondary devices, wherein the networking confirmation information indicates that the secondary devices have accessed the cooperative network; and, wherein
 the sending module is further configured to send configuration information to the plurality of secondary devices separately, wherein the configuration information is configured to instruct to switch, based on a preset management permission switching mechanism when the terminal device becomes abnormal or the terminal device exits from the cooperative network, the permission to manage the cooperative network; and, wherein the terminal device further comprises:
 a processing module, configured to: when one of the plurality of secondary devices becomes abnormal, clear the secondary device from the cooperative network based on a preset clearing rule.

10. The terminal device according to claim 9, wherein the processing module is further configured to:
 obtain device capability information of the plurality of secondary devices;
 select, based on the device capability information, at least one candidate device whose device capability meets a preset requirement from the plurality of secondary devices; and
 sequence the at least one candidate device to obtain a candidate device list, wherein a target candidate device in the candidate device list is configured to take over the management permission of the terminal device when the terminal device becomes abnormal or the terminal device exits from the cooperative network, and the target candidate device is a candidate device selected from the at least one candidate device in the candidate device list based on a sequencing order of the candidate device list.

11. The terminal device according to claim 10, wherein the processing module is configured to:
 determine a device capability of the at least one candidate device based on device capability information of the at least one candidate device; and
 sequence the at least one candidate device in ascending or descending order of device capabilities, to obtain the candidate device list.

12. The terminal device according to claim 10, wherein the device capability information comprises at least one of a central processing unit (CPU) speed of a device, a memory capacity of the device, remaining power of the device, a power consumption speed of the device, and a communication capability of the device.

13. The terminal device according to claim 9, wherein the configuration information is configured to instruct a standby device preset in the plurality of secondary devices to take over, when the terminal device becomes abnormal or is to exit from the cooperative network, the management permission of the terminal device.

14. The terminal device according to claim 9, wherein the processing module is specifically configured to:
 clear the secondary device from the cooperative network when at least one of the following conditions occurs on the secondary device:
 a transmission delay between the secondary device and the terminal device exceeds a preset delay;
 a distance between the secondary device and the terminal device exceeds a preset distance;
 a version of an operating system is earlier than a preset version;
 available power is lower than preset power; and
 an available resource does not meet a preset requirement.

15. The terminal device according to claim 9, wherein the sending module is further configured to:
 send call transfer information to the plurality of secondary devices, wherein the call transfer information is configured for setting call transfer for the plurality of secondary devices.

16. The terminal device according to claim 9, wherein the processing module is further configured to:

when there is an incoming call for the terminal device, transfer the incoming call to a preset number.

17. A multi-terminal cooperative system, wherein the multi-terminal cooperative system comprises a primary device and a plurality of secondary devices;

the primary device sends networking information to the plurality of secondary devices, wherein the networking information is configured to facilitate establishing a cooperative network between the primary device and the plurality of secondary devices, wherein the primary device has a permission to manage the cooperative network;

the plurality of secondary devices separately send networking confirmation information to the primary device, wherein the networking confirmation information is used to indicate that the secondary devices have accessed the cooperative network;

the primary device sends configuration information to the plurality of secondary devices separately, wherein the configuration information is configured to instruct to switch, based on a preset management permission switching mechanism when the primary device becomes abnormal or the primary device exits from the cooperative network, the permission to manage the cooperative network;

when the primary device becomes abnormal or the primary device exits from the cooperative network, the plurality of secondary devices switch, based on the preset management permission switching mechanism, the permission to manage the cooperative network; and when one of the plurality of secondary devices becomes abnormal, the primary device clears the secondary device from the cooperative network based on a preset clearing rule.

* * * * *

UNITED STATES PATENT AND TRADEMARK OFFICE
CERTIFICATE OF CORRECTION

| | | |
|---|---|---|
| PATENT NO. | : 11,323,854 B2 | Page 1 of 1 |
| APPLICATION NO. | : 16/884022 | |
| DATED | : May 3, 2022 | |
| INVENTOR(S) | : Ruihua Li et al. | |

It is certified that error appears in the above-identified patent and that said Letters Patent is hereby corrected as shown below:

In the Specification

In Column 1, Line 12, delete "2017," and insert -- 2017. --.

Signed and Sealed this
Second Day of August, 2022

Katherine Kelly Vidal
*Director of the United States Patent and Trademark Office*